US007546606B2

(12) United States Patent
Upton

(10) Patent No.: US 7,546,606 B2
(45) Date of Patent: *Jun. 9, 2009

(54) SYSTEM AND METHOD USING A CONNECTOR ARCHITECTURE FOR APPLICATION INTEGRATION

(75) Inventor: Mitch Upton, Highlands Ranch, CO (US)

(73) Assignee: BEA Systems, Inc., San Jose, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/271,156

(22) Filed: Oct. 15, 2002

(65) Prior Publication Data

US 2003/0093402 A1    May 15, 2003

Related U.S. Application Data

(60) Provisional application No. 60/347,919, filed on Oct. 18, 2001, provisional application No. 60/347,901, filed on Oct. 18, 2001.

(51) Int. Cl.
*G06F 9/44* (2006.01)
(52) U.S. Cl. .................. 719/318; 719/328; 707/102
(58) Field of Classification Search .................. 705/10, 705/101, 102; 719/328, 310, 313, 315, 316, 719/318; 709/203, 217, 219, 230
See application file for complete search history.

(56) References Cited

U.S. PATENT DOCUMENTS

| 5,321,841 | A | 6/1994 | East ........................... 718/107 |
| 5,469,562 | A | 11/1995 | Saether |
| 5,604,860 | A | 2/1997 | McLaughlin |
| 5,630,131 | A | 5/1997 | Palevich |
| 5,748,975 | A | 5/1998 | Van De Vanter ............ 715/531 |
| 5,801,958 | A | 9/1998 | Dangelo ....................... 716/18 |
| 5,835,769 | A | 11/1998 | Jervis .......................... 717/113 |
| 5,836,014 | A | 11/1998 | Faiman, Jr. ................. 717/156 |

(Continued)

FOREIGN PATENT DOCUMENTS

CA    2 248 634    3/2000

(Continued)

OTHER PUBLICATIONS

Towards a taxonomy of software connectors, Mehta et al., International Conference on Software Engineering Proceedings of the 22nd International conference of Software engineering, pp.: 178-187, year of Publication: 2000 ACM Press.*

(Continued)

*Primary Examiner*—Van H Nguyen
(74) *Attorney, Agent, or Firm*—Fliesler Meyer LLP

(57) ABSTRACT

Functionality can be built upon the J2EE Connector architecture when integrating applications. Bi-directional communication can be added to the system, and a common protocol can be used so that each application does not need to be integrated with every other application. A common protocol can be used, such as by application view components, to allow applications having different protocols to communicate with each other, as well as with components such as enterprise system and integration system components. The applications do not have to know the other protocols, or even that they exist.

16 Claims, 8 Drawing Sheets

U.S. PATENT DOCUMENTS

| | | | |
|---|---|---|---|
| 5,867,822 A | 2/1999 | Sankar | 705/8 |
| 5,933,838 A | 8/1999 | Lomet | 707/202 |
| 5,944,794 A | 8/1999 | Okamoto | |
| 5,961,593 A | 10/1999 | Gabber | 709/219 |
| 5,966,535 A | 10/1999 | Benedikt | 717/147 |
| 5,986,657 A | 11/1999 | Berteig et al. | |
| 6,012,083 A | 1/2000 | Savitzky | |
| 6,016,495 A | 1/2000 | McKeehan | |
| 6,018,730 A | 1/2000 | Nichols | |
| 6,023,578 A | 2/2000 | Birsan | |
| 6,023,722 A | 2/2000 | Colyer | 709/201 |
| 6,028,997 A | 2/2000 | Leymann | 717/104 |
| 6,029,000 A | 2/2000 | Woolsey | 717/147 |
| 6,044,217 A | 3/2000 | Brealey | 717/107 |
| 6,061,695 A | 5/2000 | Slivka et al. | |
| 6,067,623 A | 5/2000 | Blakley, III | 726/5 |
| 6,070,184 A | 5/2000 | Blount | 709/202 |
| 6,092,102 A | 7/2000 | Wagner | 340/7.29 |
| 6,119,149 A | 9/2000 | Notani | 709/205 |
| 6,125,363 A | 9/2000 | Buzzeo et al. | |
| 6,141,701 A | 10/2000 | Whitney | |
| 6,148,336 A | 11/2000 | Thomas et al. | |
| 6,154,738 A | 11/2000 | Call | |
| 6,185,734 B1 | 2/2001 | Saboff et al. | |
| 6,189,044 B1 | 2/2001 | Thomson et al. | |
| 6,212,546 B1 | 4/2001 | Starkovich | |
| 6,222,533 B1* | 4/2001 | Notani et al. | 715/733 |
| 6,226,675 B1 | 5/2001 | Meltzer et al. | |
| 6,226,788 B1 | 5/2001 | Schoening et al. | |
| 6,230,287 B1 | 5/2001 | Pinard | 714/31 |
| 6,230,309 B1 | 5/2001 | Turner et al. | 717/1 |
| 6,237,135 B1 | 5/2001 | Timbol | |
| 6,243,737 B1 | 6/2001 | Flanagan | |
| 6,256,676 B1 | 7/2001 | Taylor et al. | |
| 6,269,373 B1 | 7/2001 | Apte et al. | |
| 6,292,932 B1 | 9/2001 | Baisley | 717/114 |
| 6,311,327 B1 | 10/2001 | O'Brien et al. | |
| 6,324,681 B1 | 11/2001 | Sebesta et al. | 717/1 |
| 6,330,569 B1 | 12/2001 | Baisley | 707/203 |
| 6,334,114 B1 | 12/2001 | Jacobs | |
| 6,338,064 B1 | 1/2002 | Ault | 707/9 |
| 6,343,265 B1 | 1/2002 | Glebov | 703/25 |
| 6,345,283 B1 | 2/2002 | Anderson | |
| 6,348,970 B1 | 2/2002 | Marx | |
| 6,353,923 B1 | 3/2002 | Bogle | 717/128 |
| 6,356,906 B1 | 3/2002 | Lippert et al. | |
| 6,360,221 B1 | 3/2002 | Gough et al. | |
| 6,360,358 B1 | 3/2002 | Elsbree | |
| 6,367,068 B1 | 4/2002 | Vaidyanathan et al. | |
| 6,377,939 B1 | 4/2002 | Young | 705/34 |
| 6,408,311 B1 | 6/2002 | Baisley | 707/203 |
| 6,411,698 B1 | 6/2002 | Bauer | |
| 6,438,594 B1 | 8/2002 | Bowman-Amuah | |
| 6,445,711 B1 | 9/2002 | Scheel | 370/402 |
| 6,463,503 B1 | 10/2002 | Jones et al. | 711/114 |
| 6,470,364 B1 | 10/2002 | Prinzing | |
| 6,516,322 B1 | 2/2003 | Meredith | |
| 6,549,949 B1 | 4/2003 | Bowman-Amuah | 709/236 |
| 6,560,769 B1 | 5/2003 | Moore | 717/100 |
| 6,567,738 B2 | 5/2003 | Gopp | 701/109 |
| 6,584,454 B1 | 6/2003 | Hummel | |
| 6,594,693 B1 | 7/2003 | Borwankar | 709/219 |
| 6,594,700 B1 | 7/2003 | Graham | 709/230 |
| 6,601,113 B1 | 7/2003 | Koistinen | |
| 6,604,198 B1 | 8/2003 | Beckman | 713/167 |
| 6,609,115 B1 | 8/2003 | Mehring | |
| 6,615,258 B1 | 9/2003 | Barry | |
| 6,636,491 B1 | 10/2003 | Kari | |
| 6,637,020 B1 | 10/2003 | Hammond | |
| 6,643,652 B2 | 11/2003 | Helgeson | |
| 6,654,932 B1 | 11/2003 | Bahrs | |
| 6,662,357 B1 | 12/2003 | Bowman-Amuah | |
| 6,678,518 B2 | 1/2004 | Eerola | 455/422.1 |
| 6,684,388 B1 | 1/2004 | Gupta et al. | |
| 6,687,702 B2 | 2/2004 | Vaitheeswaran | 707/10 |
| 6,687,848 B1 | 2/2004 | Najmi | 714/4 |
| 6,721,740 B1 | 4/2004 | Skinner et al. | |
| 6,721,777 B1* | 4/2004 | Sharma | 718/101 |
| 6,721,779 B1 | 4/2004 | Maffeis | |
| 6,732,237 B1 | 5/2004 | Jacobs | 711/119 |
| 6,738,975 B1 | 5/2004 | Yee et al. | |
| 6,748,420 B1 | 6/2004 | Quatrano | 709/205 |
| 6,754,884 B1 | 6/2004 | Lucas | |
| 6,757,689 B2 | 6/2004 | Battas | 707/101 |
| 6,789,054 B1 | 9/2004 | Makhlouf | |
| 6,795,967 B1 | 9/2004 | Evans | 719/310 |
| 6,799,718 B2 | 10/2004 | Chan et al. | |
| 6,802,000 B1 | 10/2004 | Greene | 713/168 |
| 6,804,686 B1 | 10/2004 | Stone | 707/104.1 |
| 6,823,495 B1 | 11/2004 | Vedula | |
| 6,832,238 B1 | 12/2004 | Sharma | |
| 6,836,883 B1 | 12/2004 | Abrams et al. | |
| 6,847,981 B2 | 1/2005 | Song | |
| 6,850,979 B1 | 2/2005 | Saulpaugh | 709/225 |
| 6,874,143 B1 | 3/2005 | Murray | |
| 6,877,023 B1 | 4/2005 | Maffeis et al. | |
| 6,889,244 B1 | 5/2005 | Gaither | 709/202 |
| 6,915,519 B2 | 7/2005 | Williamson | 719/313 |
| 6,918,084 B1 | 7/2005 | Slaughter | 715/513 |
| 6,950,872 B2 | 9/2005 | Todd, II | |
| 6,959,307 B2 | 10/2005 | Apte | 707/104.1 |
| 6,959,340 B1 | 10/2005 | Najmi | |
| 6,963,914 B1 | 11/2005 | Breitbart | 709/226 |
| 6,971,096 B1 | 11/2005 | Ankireddipally | |
| 6,976,086 B2 | 12/2005 | Sadeghi | 709/236 |
| 7,000,219 B2 | 2/2006 | Barrett et al. | |
| 7,017,146 B2 | 3/2006 | Dellarocas | |
| 7,043,722 B2 | 5/2006 | Bau, III | |
| 7,051,072 B2 | 5/2006 | Stewart | |
| 7,051,316 B2 | 5/2006 | Charisius | |
| 7,054,858 B2 | 5/2006 | Sutherland | 707/4 |
| 7,062,718 B2 | 6/2006 | Kodosky | |
| 7,069,507 B1 | 6/2006 | Alcazar | |
| 7,072,934 B2 | 7/2006 | Helgeson | |
| 7,073,167 B2 | 7/2006 | Iwashita | |
| 7,076,772 B2 | 7/2006 | Zatloukal | |
| 7,089,584 B1 | 8/2006 | Sharma | |
| 7,096,422 B2 | 8/2006 | Rothschiller | |
| 7,107,578 B1 | 9/2006 | Alpern | |
| 7,111,243 B1 | 9/2006 | Ballard | |
| 7,117,504 B2 | 10/2006 | Smith | 709/201 |
| 7,127,704 B2 | 10/2006 | Van De Vanter | |
| 7,134,072 B1 | 11/2006 | Lovett et al. | |
| 7,143,186 B2 | 11/2006 | Stewart | |
| 7,146,422 B1 | 12/2006 | Marlatt et al. | |
| 7,165,041 B1 | 1/2007 | Guheen et al. | |
| 7,181,731 B2 | 2/2007 | Pace et al. | |
| 7,184,967 B1 | 2/2007 | Mital | |
| 7,231,421 B2 | 6/2007 | Kawakura et al. | |
| 7,240,331 B2 | 7/2007 | Vion-Dury | |
| 7,269,625 B1 | 9/2007 | Willhide et al. | |
| 7,406,664 B1 | 7/2008 | Morton et al. | |
| 2001/0032263 A1 | 10/2001 | Gopal et al. | |
| 2002/0004848 A1 | 1/2002 | Sudarshan | |
| 2002/0010781 A1 | 1/2002 | Tuatini | |
| 2002/0010803 A1 | 1/2002 | Oberstein | |
| 2002/0016759 A1 | 2/2002 | Macready et al. | |
| 2002/0035604 A1 | 3/2002 | Cohen | |
| 2002/0038336 A1 | 3/2002 | Abileah et al. | |
| 2002/0049788 A1 | 4/2002 | Lipkin et al. | |
| 2002/0073080 A1 | 6/2002 | Lipkin | |
| 2002/0073236 A1 | 6/2002 | Helgeson | |
| 2002/0073396 A1 | 6/2002 | Crupi | |
| 2002/0078365 A1 | 6/2002 | Burnett et al. | |

| | | |
|---|---|---|
| 2002/0083075 A1 | 6/2002 | Brummel |
| 2002/0091944 A1 | 7/2002 | Anderson et al. |
| 2002/0111922 A1 | 8/2002 | Young |
| 2002/0116454 A1 | 8/2002 | Dyla et al. |
| 2002/0120685 A1 | 8/2002 | Srivastava |
| 2002/0138582 A1 | 9/2002 | Chandra et al. |
| 2002/0143960 A1 | 10/2002 | Goren |
| 2002/0152106 A1 | 10/2002 | Stoxen |
| 2002/0152244 A1 | 10/2002 | Dean et al. |
| 2002/0161826 A1 | 10/2002 | Arteaga |
| 2002/0165936 A1 | 11/2002 | Alston et al. |
| 2002/0169644 A1 | 11/2002 | Greene |
| 2002/0174178 A1 | 11/2002 | Stawikowski |
| 2002/0174241 A1 | 11/2002 | Beged-Dov et al. |
| 2002/0184145 A1 | 12/2002 | Sijacic et al. |
| 2002/0184610 A1 | 12/2002 | Chong |
| 2002/0188486 A1 | 12/2002 | Gil et al. |
| 2002/0188513 A1 | 12/2002 | Gil et al. |
| 2002/0194244 A1 | 12/2002 | Raventos |
| 2002/0194267 A1 | 12/2002 | Flesner |
| 2002/0194495 A1* | 12/2002 | Gladstone et al. ............ 713/200 |
| 2003/0004746 A1 | 1/2003 | Kheirolomoom |
| 2003/0005181 A1 | 1/2003 | Bau, III et al. |
| 2003/0014439 A1 | 1/2003 | Boughannam |
| 2003/0018661 A1 | 1/2003 | Darugar |
| 2003/0018665 A1 | 1/2003 | Dovin et al. |
| 2003/0018832 A1* | 1/2003 | Amirisetty et al. ........... 709/328 |
| 2003/0018963 A1 | 1/2003 | Ashworth et al. |
| 2003/0023957 A1 | 1/2003 | Bau et al. |
| 2003/0028579 A1 | 2/2003 | Kulkarni |
| 2003/0041050 A1 | 2/2003 | Smith et al. |
| 2003/0041198 A1 | 2/2003 | Exton et al. |
| 2003/0043191 A1 | 3/2003 | Tinsley |
| 2003/0046266 A1 | 3/2003 | Mullins et al. |
| 2003/0046591 A1 | 3/2003 | Asghari-Kamrani |
| 2003/0051063 A1 | 3/2003 | Skufca et al. |
| 2003/0051066 A1 | 3/2003 | Pace |
| 2003/0055868 A1 | 3/2003 | Fletcher |
| 2003/0055878 A1 | 3/2003 | Fletcher |
| 2003/0065827 A1 | 4/2003 | Skufca et al. |
| 2003/0069975 A1 | 4/2003 | Abjanic et al. |
| 2003/0074217 A1* | 4/2003 | Beisiegel et al. ................ 705/1 |
| 2003/0074467 A1 | 4/2003 | Oblak et al. |
| 2003/0079029 A1 | 4/2003 | Garimella |
| 2003/0084203 A1 | 5/2003 | Yoshida |
| 2003/0093470 A1 | 5/2003 | Upton |
| 2003/0110117 A1 | 6/2003 | Saidenberg et al. |
| 2003/0110446 A1 | 6/2003 | Nemer |
| 2003/0126136 A1 | 7/2003 | Omoigui |
| 2003/0149791 A1 | 8/2003 | Kane |
| 2003/0167358 A1 | 9/2003 | Marvin |
| 2003/0196168 A1 | 10/2003 | Hu |
| 2003/0233631 A1 | 12/2003 | Curry et al. |
| 2004/0019645 A1 | 1/2004 | Goodman |
| 2004/0040011 A1 | 2/2004 | Bosworth |
| 2004/0068568 A1 | 4/2004 | Griffin et al. |
| 2004/0078373 A1 | 4/2004 | Ghoneimy |
| 2004/0133660 A1 | 7/2004 | Junghuber et al. |
| 2004/0148336 A1 | 7/2004 | Hubbard |
| 2004/0204976 A1 | 10/2004 | Oyama |
| 2004/0216086 A1 | 10/2004 | Bau |
| 2004/0225995 A1 | 11/2004 | Marvin et al. |
| 2004/0260715 A1 | 12/2004 | Mongeon |
| 2005/0050068 A1 | 3/2005 | Vaschillo |
| 2005/0223392 A1 | 10/2005 | Cox et al. |
| 2005/0278585 A1 | 12/2005 | Spencer |
| 2006/0085797 A1 | 4/2006 | Connelly |
| 2006/0206856 A1 | 9/2006 | Breeden |
| 2006/0234678 A1 | 10/2006 | Juitt |
| 2007/0038500 A1 | 2/2007 | Hammitt |

FOREIGN PATENT DOCUMENTS

| | | |
|---|---|---|
| EP | 1 006 443 A2 | 6/2000 |
| EP | 1 061 445 A2 | 12/2000 |
| WO | 00/29924 | 5/2000 |
| WO | 01/90884 A2 | 11/2001 |
| WO | WO0190893 A2 * | 11/2001 |

OTHER PUBLICATIONS

Implementation of an enterprise-level groupware system based on J2EE platform and WebDAV protocol, Qu et al., Enterprise Distributed Object Computing Conference, 2000. EDOC 2000. Proceedings. Fourth InternationalSep. 25-28, 2000 p. (160-169).*

Newcomer, Eric. "Understanding Web Services: XML, WSDL, SOAP, and UDDI". May 2002.*

U.S. Appl. No. 10/271,047, filed Oct. 15, 2002, Mitch Upton.
U.S. Appl. No. 10/271,157, filed Oct. 15, 2002, Mitch Upton.
U.S. Appl. No. 10/271,162, filed Oct. 15, 2002, Mitch Upton.
U.S. Appl. No. 10/271,194, filed Oct. 15, 2002, Mitch Upton.
U.S. Appl. No. 10/271,215, filed Oct. 15, 2002, Mitch Upton.
U.S. Appl. No. 10/271,244, filed Oct. 15, 2002, Mitch Upton.
U.S. Appl. No. 10/271,402, filed Oct. 15, 2002, Mitch Upton.
U.S. Appl. No. 10/271,410, filed Oct. 15, 2002, Mitch Upton.
U.S. Appl. No. 10/271,414, filed Oct. 15, 2002, Mitch Upton.
U.S. Appl. No. 10/271,423, filed Oct. 15, 2002, Mitch Upton.

Hewlett-Packard, *HP Application Server*, Technical Guide Version 8.0, HP, Nov. 15, 2001, pp. 1-234.

Sun Microsystems, *iPlanet Application Server 6.0 White Paper*, iPlanet E-Commerce Solutions, May 25, 2000, pp. 1-104.

Enrique Duvos & Azer Bestavros, *An Infrastructure for the Dynamic Distribution of Web Application and Services*, Department of Computer Science Boston University, Dec. 2000, pp. 1-104.

Ed Roman & Rickard Öberg, *The Technical Benefits of EJB and J2EE Technologies over COM+ and Windows DNA*, Enterprise Edition (J2EE) Technologies, Dec. 1999, pp. 1-24.

Marcello Mariucci, *Enterprise Application Server Development Environments*, University of Stuttgart, Oct. 10, 2000, pp. 1-30.

Mohan, C. et al. "Aries: A Transaction Recovery Method Supporting Fine-Granularity Locking and Partial Rollbacks Using Write-Ahead Logging", ACM Transaction on Database Systems, Vol. 17, No. 1, Mar. 1992, pp. 94-162.

Kunisetty, Workflow Modeling and Simulation Using an Extensible Object-Oriented Knowledge Base Management System, CiteSeer, 1996, pp. 1-60, entire reference.

Van Der Aalst et al., Verification of XRL: An XML-Based Workflow Language, IEEE, Jul. 2001, pp. 427-432, entire reference.

Blake, Rule-Driven Coordination Agents: A Self-Configurable Agent Architecture for Distributed Control, IEEE, Mar. 2001, pp. 271-277, entire reference.

Dahalin et al, Workflow Interoperability Using Extensible Markup Language (XML), IEEE, Jul. 2002, pp. 513-516, entire reference.

Lauer, Christophe, Introducing Microsoft DotNet, Jul. 2, 2002, pp. 4-5.

Sosnoski, "XML and Java Technologies: Data binding, Part 1: Code generation approaches—JAXB and more," IBM, pp. 1-11, Jan. 2003.

Erich Liebmann et al., "Adaptive Data Dissemination and Caching for Edge Service Architectures built with the J2EE," Mar. 2004, ACM Press, 2004 ACM Symposium on Applied Computing, pp. 1717-1724.

Chen et al., "eCo Architecture to Electronic Commerce Interoperability," Jun. 29, 1999, CommerceNet.

Embury, S.M., et al., "Assisting the Comprehension of Legacy Transactions," Proceedings of the 8th Working Conference on Reverse Engineering, Oct. 2-5, 2001, pp. 345-354.

Mays, E., et al., "A Persistent Store for Large Shared Knowledge Bases," IEEE Transactions on Knowledge and Data Engineering, vol. 3, No. 1, Mar. 1991, pp. 33-41.

Tang, C., et al., "Integrating Remote Invocation and Distributed Shared State," Proceedings of the 18th International Parallel and Distributed Processing Symposium, IEEE, Apr. 26-30, 2004.

JAVA™ Debugging Interface—definition, retrieved from <URL http://java.sun.com/j2sc/1.4.2/docs/guide/jpda/jdi/overview-summary.html on Feb. 21, 2007.

Hewlett-Packard Company, "hp application server," developer's guide version 8.0, 1999-2001, pp. 27-81, 127-160, 195-217.

Kilgore, R.A., "Multi-language, open-source modeling using the Microsoft.NET Architecture," Proceedings of the 2002 Winter Simulation Conference, IEEE, pp. 629-633.

Bogunovic, N., "A Programming Model for Composing Data-Flow Collaborative Applications," *ecbs*, p. 106, IEEE Conference and Workshop on Engineering of Computer-Based Systems, 1999.

Sung, S.Y., et al., "A Multimedia Authoring Tool for the Internet," Proceedings of the 1997 IEEE International Symposium on Consumer Electronics, Dec. 1997, pp. 304-308.

Smith, M., et al., "Marching Towards a Software Reuse Future," ACM SIGAda Ada Letters, vol. XIV, Issue 6, Nov./Dec. 1994, pp. 62-72.

BEA, "Transforming Data Using Xquery Mapper," 2006, BEA AquaLogic Service Bus 2.0 Documentation, pp. 1-19.

Stylus Studio, "Xquery Mapper," www.stylusstudio.com/xquery_mapper.html, printed Jun. 5, 2007, pp. 1-6.

Altova, "XML-to-XML Mapping," 2007, Altova, pp. 1-3.

Jamper, "Jamper-Java XML Mapper," 2007, Sourceforge, pp.. 1-4.

Alonso, G., et al., "Advanced Transaction Models in Workflow Contexts," Proceedings of the 12th International Conference on Data Engineering, retrieved from: http://citeseer.ist.psu.edu/alonso96advanced.html.

Van Der Aalst, W, et al., "XML Based Schema Definition for Support of Inter-organizational Workflow," University of Colorado and University of Eindhoven report, retrieved from: http://citeseer/ist.psu.edu/vanderaalst00xml.html, 2000.

Plaindoux, D., "XML Transducers in Java," The Eleventh International World Wide Web Conference, retrieved from: http://www2002.org/CDROM/poster/132/index.html, May 2002.

Microsoft, "Microsoft.net Framework," Microsoft Corporation, pp. 54 pages (2000).

Muller, Robert, "Event-Oriented Dynamic Adaption of Workflows: Model, Architecture, and Implementation," Dissertation, University of Leipzig, Germany, 351 pages (2002).

Ort, Ed, et al., Java Architecture for XML Binding (JAXB), Java Sun, pp. 1-14 (Mar. 2003).

Peltz, Chris, "Web Services Orchestration," Hewlett Packard Company, pp. 1-20 (Jan. 2003).

Shannon, Bill, "Java™ 2 Platform Enterprise Edition Specification, v1.3," Sun Microsystems, Inc., chapters 1-11 (Oct. 10, 2000).

Wikipedia, Java Architecture for XML Binding (JAXB), pp. 1-3 (Oct. 2007).

Willink, Edward D., "Meta Compilation for C++," University of Surrey, 379 pages (Jan. 2000).

Allamaraju, et al, "Professional Java Server Programming J2EE 1.3 Edition," WROX, Sep. 9, 2001, pp. 1009-1057.

Sun Microsystems, "J2EE Connector Architecture 1.0," Aug. 8, 2001, retrieved from the internet at http://java.sun.com/j2ee/connector/download.html, whole document.

Supplementary European Search Report for EP 02 78 4131, dated Aug. 8, 2007, 3 pages.

Sun Microsystems, "Java Message Service Version 1.0.2b," Aug. 27, 2001, 118 pages.

FOLDOC, :Java Message Service Definition of JMS, http//foldoc.org/?JMS; Jun. 22, 2001, 1 page.

XAResource (Java™ 2 Platform EE v.1.4), "Interface XAResource," Dec. 12, 2002, 9 pages.

\* cited by examiner

SYSTEM AND METHOD USING A CONNECTOR ARCHITECTURE FOR APPLICATION INTEGRATION

CLAIM OF PRIORITY

This application claims priority to U.S. Provisional Patent Application No. 60/347,919, filed Oct. 18, 2001, entitled "APPLICATION VIEW," as well as application Ser. No. 60/347,901, filed Oct. 18, 2001, entitled "EVENT ADAPTER," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

CROSS-REFERENCED CASES

The following applications are cross-referenced and incorporated herein by reference:

U.S. patent application Ser. No. 10/271,194 entitled "APPLICATION VIEW COMPONENT FOR SYSTEM INTEGRATION," by Mitch Upton, filed Oct. 15, 2002 and issued on Jul. 18, 2006 as U.S. Pat. No. 7,080,092.

U.S. patent application Ser. No. 10/271,162 entitled "SYSTEM AND METHOD FOR PROVIDING A JAVA INTERFACE TO AN APPLICATION VIEW COMPONENT," by Mitch Upton, filed Oct. 15, 2002.

U.S. patent application Ser. No. 10/271,244 entitled "SYSTEM AND METHOD FOR INVOKING BUSINESS FUNCTIONALITY FOR A WORKFLOW," by Mitch Upton, filed Oct. 15, 2002.

U.S. patent application Ser. No. 10/271,414 entitled "SYSTEM AND METHOD FOR USING WEB SERVICES WITH AN ENTERPRISE SYSTEM," by Mitch Upton, filed Oct. 15, 2002 and issued on Mar. 4, 2006 as U.S. Pat. No. 7,340,714.

U.S. patent application Ser. No. 10/271,157 entitled "SYSTEM AND METHOD FOR IMPLEMENTING AN EVENT ADAPTER," by Mitch Upton, filed Oct. 15, 2002.

U.S. patent application Ser. No. 10/271,047 entitled "SYSTEM AND METHOD FOR IMPLEMENTING A SCHEMA OBJECT MODEL IN APPLICATION INTEGRATION," by Mitch Upton, filed Oct. 15, 2002.

U.S. patent application Ser. No. 10/271,402 entitled "SYSTEM AND METHOD UTILIZING AN INTERFACE COMPONENT TO QUERY A DOCUMENT" by Mitch Upton, filed Oct. 15, 2002 and issued on Dec. 19, 2006 as U.S. Pat. No. 7,152,204.

U.S. patent application Ser. No. 10/271,423 entitled "SYSTEM AND METHOD USING ASYNCHRONOUS MESSAGING FOR APPLICATION INTEGRATION," by Mitch Upton, filed Oct. 15, 2002.

U.S. patent application Ser. No. 10/271,215 entitled "SYSTEMS AND METHODS FOR INTEGRATION ADAPTER SECURITY," by Mitch Upton, filed Oct. 15, 2002.

U.S. patent application Ser. No. 10/271,410 entitled "SYSTEM AND METHOD FOR IMPLEMENTING A SERVICE ADAPTER," by Mitch Upton, filed Oct. 15, 2002.

TECHNICAL FIELD

The invention relates generally to the integration of applications.

BACKGROUND

E-commerce has become a major driving factor in the new economy. To be successful in the long-term, e-commerce will require many companies to engage in cross-enterprise collaborations. To achieve cross-enterprise integration, a company must first integrate its internal applications. Using existing technology and tools, application integration can be an expensive proposition. No integration solution exists that is easy to use, affordable, and based on industry standards. Neither does a solution exist that is based on an industry standard infrastructure, has universal connectivity, is capable of massive scalability, and has accessible business process tools.

Application integration to this point has been very inward-focused. Many existing integration systems have not focused on integrating applications between enterprises. Even when integration solutions were used for cross-enterprise integration, the solutions were still narrowly focused and aimed at vertical markets. This inward focus did little to help companies field external business-to-consumer and business-to-business applications, such as applications that can utilize the Internet to generate revenue and reduce costs. The requirement for Internet-enabled applications led to the rise of the application server market. To date, application servers have primarily been used to host external applications targeted at customers and partners. Application servers are themselves packaged applications that, instead of solving a specific problem, are general-purpose platforms that host vertical solutions.

The first attempts at application integration were primarily focused on low-level implementation details such as the format of the data, the byte ordering between machines, and character encoding. The focus on low-level data formats was necessary because, for the first generation of application integration solutions, there were no widely adopted standards for data encoding that could be deployed across multiple vertical applications.

The traditional approach involved connecting individual systems to, in effect, hardwire the systems together. This approach can be complex, as connecting different systems can require an intimate, low-level knowledge of the proprietary technologies of multiple systems.

Present integration systems, which have moved away from "hardwiring" systems together, still suffer from a lack of standards. Each integration vendor typically provides a proprietary solution for application integration, message transformation, message formats, message transport, and routing. Not one of these systems to date has achieved significant market share to enable its technologies to become the de-facto standard. This lack of standards has given packaged application vendors little incentive to integrate these systems with their applications. Further, each of these integration systems or servers has its own proprietary API, such that packaged application vendors cannot leverage development beyond a single integration server. This fragmentation of the integration market has provided little financial incentive for third parties.

BRIEF SUMMARY

Systems and methods in accordance embodiments of the present invention add functionality on top of the J2EE Connector architecture. A system and method for integrating applications can use at least one application view component that provides an interface to an integration or enterprise system. A resource adapter can be used to invoke functionality in an enterprise or integration system and expose that functionality to the application view component. A common protocol, implemented on top of the J2EE Connector architecture, can be used by the application view component to allow applications having different protocols to communicate with each other, the enterprise system, and/or the integration system using the common protocol. An application integration framework built on top of the J2EE Connector architecture can provide a standards-based architecture for hosting a resource adapter.

Other features, aspects, and objects of the invention can be obtained from a review of the specification, the figures, and the claims.

DETAILED DESCRIPTION

Figure 1:
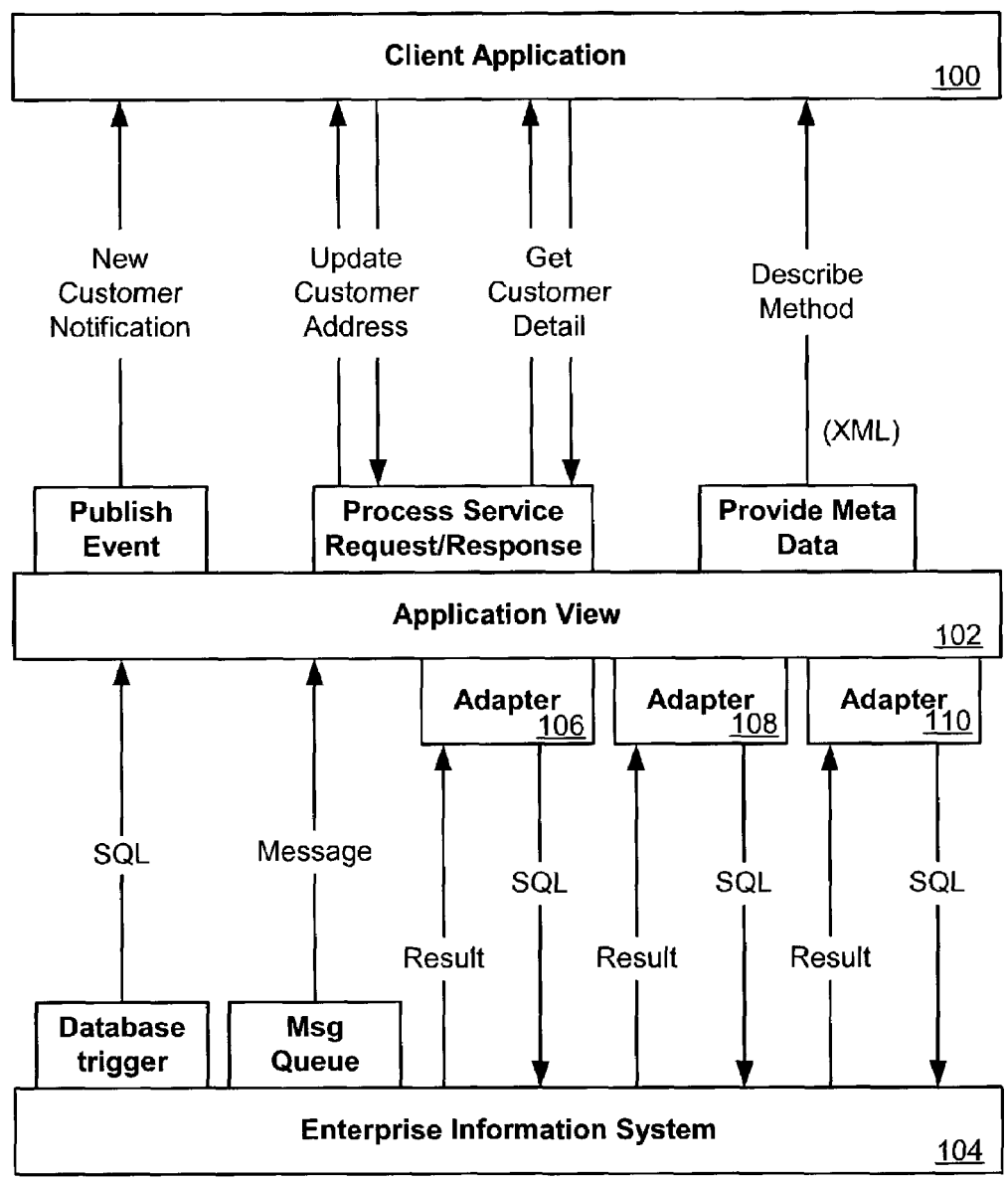
FIG. 1 is a diagram of an integration system that can be used in accordance with one embodiment of the present invention.

Application integration components can be used to integrate a variety of applications and systems, such as Enterprise Information Systems (EISs). Information technology (IT) organizations typically utilize several highly-specialized applications. Without a common integration platform to facilitate application-level integration, these applications cannot be integrated without extensive, highly-specialized development efforts.

Application integration can utilize adapters to establish an enterprise-wide, united framework for integrating any current or future application. Adapters can simplify integration efforts by allowing each application to be integrated with an application server, instead of requiring that each application being integrated with every other application.

The development and widespread acceptance of standards such as the Java 2 Platform, Enterprise Edition (J2EE™) from Sun Microsystems™, Inc. of Santa Clara, Calif., as well as the eXtensible Markup Language (XML), has laid the groundwork for a standardized approach to the development of these adapters. Perhaps the most significant of these standards for application integration is the J2EE™ Connector architecture. The J2EE™ Connector architecture provides a standardized approach for the development of adapters for all types of applications, from legacy mainframe applications, such as CICS® from IBM®, to packaged applications such as PeopleSoft®, Siebel®, and SAP®. The adoption of such standards enables businesses to develop adapters that work on any J2EE™-compliant application server, for example.

Application integration can build on this standardized approach in an application integration framework by providing a standards-based architecture for hosting J2EE Connector architecture-based adapters. Developers can build J2EE Connector architecture-compliant adapters and deploy these adapters, in the integration framework, to connect enterprise applications to an application server.

These adapters can be used to define business-focused interfaces to an EIS, the interfaces referred to herein as "application views" of the respective adapters. An application view can provide a simple, self-describing, consistent interface to services and events in an application. Application views can make use of an adapter for an EIS, making it possible to expose existing information systems as business services. Unlike adapters, however, an application view does not require users to have intimate knowledge of the EIS or the client interface for that EIS, such that non-programmers or technical analysts can use application views. An application view can provide a business-oriented way for business analysts to access enterprise data without worrying about the programmatic details defined in an adapter. These same users may be otherwise unable to use an adapter directly, due to a lack of familiarity with the EIS.

An application integration component directed at enterprise application integration can have several primary aspects. If the functionality of an EIS such as a PeopleSoft system or an SAP system is to be invoked, an implementation of the J2EE Connector Architecture can be used. If something occurs inside an EIS system, such as a trigger going off, an event can be generated. This event may, in some embodiments, need to be communicated to an external application. An event architecture in an application integration component can handle this communication.

Application Views

An application view can provide significant value to an application integration component. An application view can abstract away much of the complexity in dealing with an application, such as a backend EIS system. Application views can also simplify the way in which adapters are accessed. Application views can provide a layer of abstraction, for example, between an adapter and the EIS functions exposed by that adapter. Instead of accessing an EIS by direct programming a user can simply: edit an adapter's application views, create new application views, or delete any obsolete application view(s). A layer of abstraction formed by application views can help non-programmers maintain the services and events exposed by an adapter. Each application view can be specific to a single adapter, and can define a set of business functions on that adapter's EIS. After an adapter is created, a Web-based interface for the adapter can be used to define application views.

If an application view is used as a primary user interface for an adapter, a number of features can be included that are not commonly found in existing enterprise application integration technologies. Application views can, for example, use XML as a common language among applications. Service and event definitions can be used to expose application capabilities. XML schemas can be used to define the data for services and events. Bi-directional communication can also be supported in adapters.

An application view can be an integral part of an integration framework. An application view can provide a view of the application capabilities exposed by an adapter that a user can customize to meet specific needs. A user can tailor an application view, for example, for a specific business purpose. As a result, the application view can provide an effective alternative to the "one size fits all" approach that many applications provide for the design of a client interface. An application view can be defined for only the business or other capabilities that are applicable for a specific purpose. The capabilities can be customized such as by naming, describing, and defining the data requirements.

In one example of a system using a resource adapter and application view component, shown in FIG. 1, adapters 106, 108, 110 can be developed that allow a client application 100 to communicate with an Enterprise Information System 104 through the use of an application view 102. A developer can begin by coding an adapter that exposes the functionality in the enterprise application that accesses enterprise data. The functionality the adapter exposes could, for example, update records in a database using SQL statements, or could request information from an SAP system using its BAPI or IDOC interfaces. A business analyst, working with the developer, can then define an application view of the adapter using an application view interface.

An application view is an object, which can be implemented in one embodiment as a stateless session JavaBean. There can be a Java interface to the application view for the client application. A Java application can be custom coded to use that object, such as by passing XML in and receiving XML back. In addition, a business process manager component can be included that allows process engineers to define workflows, and that allows application views to be invoked as business services. A workflow is a graphical representation of a business process, which can be defined and modified using, for example, a business process management (BPM) component such as a BPM plug-in, as well as a business process engine. In a workflow, a callout can be made to an EIS to get information such as a customer's credit record. The fact that the application view is a Java object or enterprise JAVABeans can be hidden from the process and designer.

In application integration, new application views can be hot-deployed against an existing EIS through a web-based interface. An application view is hot-deployed when it is deployed with the system running, without restarting the destination server. A new customer management tool for SAP, for example, can also be defined through a web browser.

Integration Framework

Application integration can utilize an integration framework, which can provide a systematic, standards-based architecture for hosting application views. Features of such a framework can include application views for exposing application functions and design-time graphical user interfaces (GIS), such as web-based interfaces that can be used for creating application views. The integration framework utilizes adapters, instead of "hardwiring" enterprise systems together. Once an adapter is deployed for an EIS, other components and applications can use that adapter to access data on the EIS.

A framework in accordance with one embodiment of the present invention relies on XML as the standard format for messages. XML includes XSLT, a standard for transforming XML documents into other XML documents. XSLT is designed for use as part of XSL, which is a stylesheet language for XML. In XSLT, an XML document is used to specify the operations to perform on a class of XML documents in order to transform the documents' structure and content. An XSLT transformation can make use of any of the operations built into the Java programming language, or can make use of custom operations written either in Java or in native code. An integration framework allows a business process to invoke an XSLT engine in order to transform XML messages.

An integration framework can also rely on standards for transporting messages such as Java Message Service (JMS) and HTTPS. JMS is a standard API for interfacing with message transport systems. Using JMS, a framework can utilize any message transport mechanism that provides a JMS interface. The J2EE Connector architecture standard does not specify a message transport mechanism, but an application integration framework can specify such a transport mechanism.

An integration framework can be based on an existing standard infrastructure, such as an application server that supports J2EE, JMS, and the J2EE Connector architecture. Using such a standard infrastructure also provides for high availability and scalability, such as by clustering and resource pooling. The framework can provide for universal connectivity by enabling the construction of XML-based application adapters that can connect to any legacy and packaged application. An adapter development kit can be used to allow users such as customers, system integrators, and packaged application vendors to quickly develop J2EE connector architecture-compliant and integration framework-based adapters. The framework can utilize XML, which means that the same data format can be used for both within- and between-enterprise integration, since many e-commerce systems use XML as the standard message format.

An integration framework can also utilize a business-process engine to allow non-programmers to graphically construct and maintain business processes. An integration framework can implement a common model on top of the J2EE Connector architecture that is focused on business-level concepts. This model, which can consist of XML-encoded events and services, allows the management of a consistent integration environment, regardless of the interface required between adapters and their target applications. The business processes can react to events generated by applications, and they can invoke an application's functionality via services that are exposed by an application adapter.

Services

A "service" can act as a business function that can be invoked by a user. Service invocations can cause messages to be sent to an application following a request/response model. This model can differ from a publish/subscribe model, in that messages are only sent when requested by a user. This can be implemented, for example, using a point-to-point messaging system. Both events and services can be passed through the system as XML documents.

A service can constitute business logic within an application that an application view exposes for reuse. When an application view receives an XML document containing a request to invoke a business service, the application view can invoke that functionality within its target application and return an XML document that describes the result. Each service on an application view can represent a single function, such as a single, logical business function, within a target application. A service can take request data, such as in the form of an XML document, and return response data, which can also take the form of an XML document. Services can represent bi-directional communication between an application view client and a target application. Services can allow for synchronous or asynchronous communication between applications.

Figure 2:
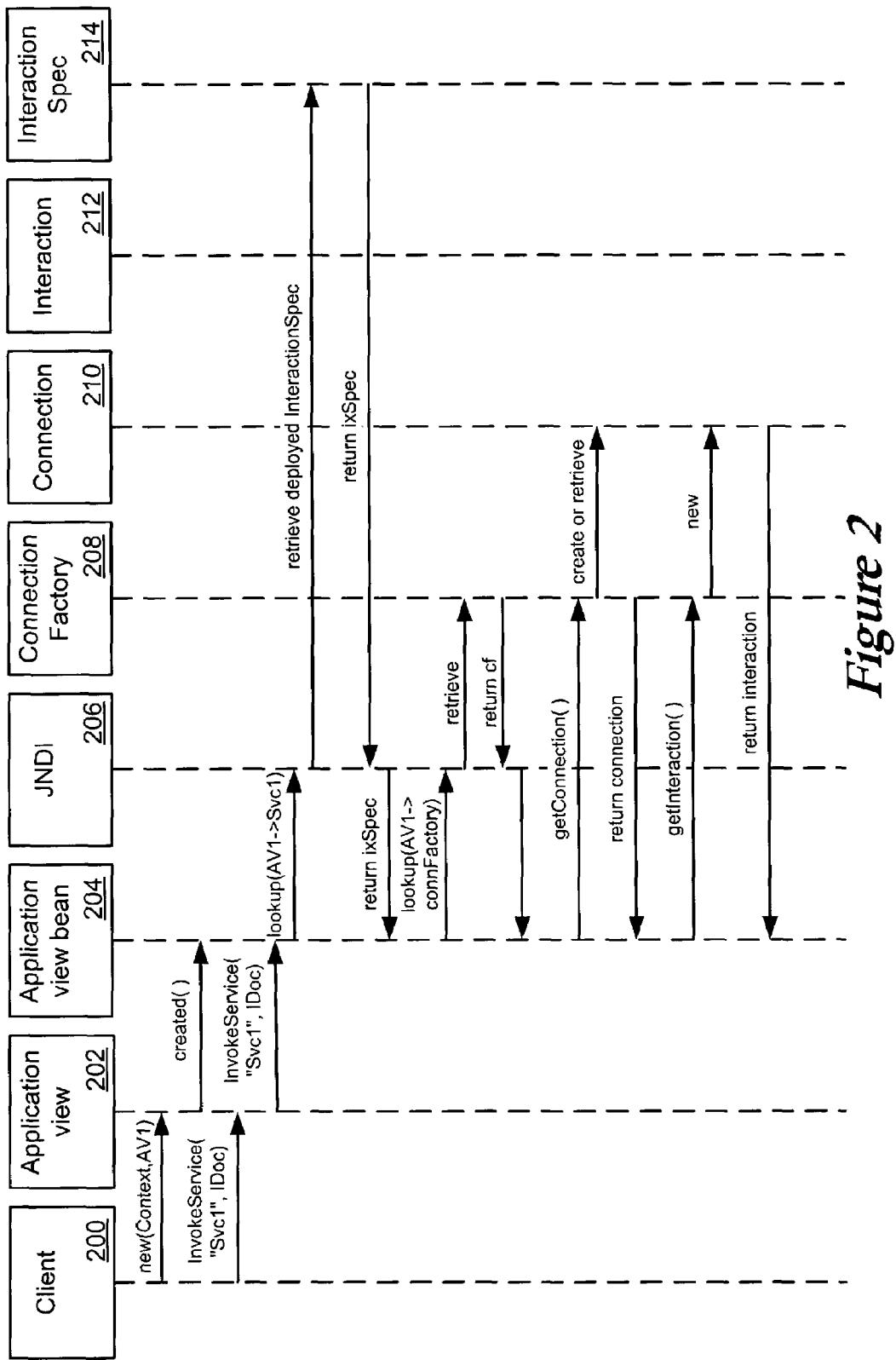
FIGS. 2 and 3 are diagrams showing one method useful for the synchronous invoking of services that can be used with the system of FIG. 1.
Figure 3:
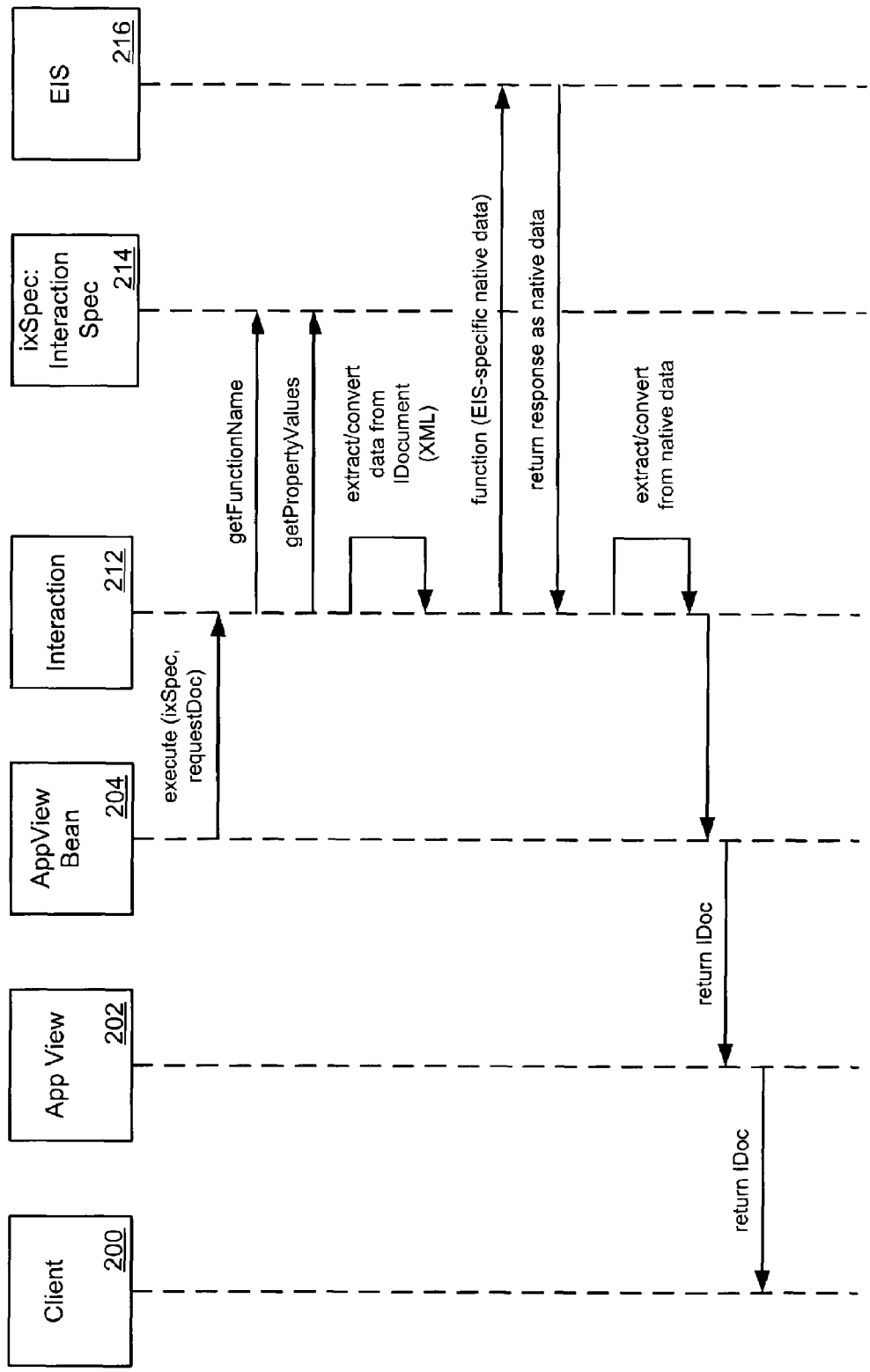

FIGS. 2 and 3 refer to one method for the synchronous invoking of services that can be used, for example, with a system as shown in FIG. 1. Across the top of the figures are various objects that can be used in an interaction, including a client 200, an application view 202, an application view bean 204, a JNDI service 206, a connection factory 208, a connection 210, an interaction 212, an interaction specification 214, and an enterprise information system 214. In invoking a service, a user or client 200 might, for example, call functionality to get details relating to a customer from an EIS system 216. FIG. 2 shows the first part, and FIG. 3 the second part, of one sequence of steps that can occur in an application view engine to enable a client to invoke a service in an EIS.

In the first step, a Java object or application view 202 is issued from the client 200 for a web service. Three basic clients in this example can include workflow, BPM, and custom-coded Java applications. A new instance will be created on the server by creating an enterprise java bean, triggered by calling an ejbCreate( ) or create( ) routine.

The client 200 requests and receives the Request Document or IDoc definition for a service, such as GetCustomerDetail, in the example referred to as Service 1, or "Svc1." This definition can be used to create a default document. Creating a default document does a lot of the work otherwise required of a user by filling in a skeleton XML document to be sent to the backend EIS. It also saves the client a lot of work in creating a document, as the definition knows exactly how the document should look.

Once the skeleton document is created, the client can call a routine to set various parameters on the request into the XML document, such as setting a customer number, name, or address. After the client has set all the necessary parameters on a document, or IDoc, the client 200 can use the application view 202 to invoke the service, such as by calling "InvokeService." The user can pass the request document with the invoke.

The invoke request can trigger an application view bean 204 to begin interacting with a J2EE connector, or Connection Factory 208, such as by calling "GetInteraction." Such a routine can get a connection, such as to SAP. The connector architecture can provide for connection pulling, transaction management, and security services for adapters. The connector architecture can get the interaction on the connection, then execute the interaction and pass the request document. The interaction object can be provided by a resource adapter. SAP, for example, builds a particular interaction into an adapter.

The interaction can figure out what specific EIS functionality is being invoked, and can invoke that functionality on the EIS ("function") object 216. This approach is very adapter-specific. Some of the value added to the J2EE Connector architecture is that this functionality is hidden behind standard APIs. Finally, the interaction object 212 can create a response XML document that is passed back to the client 200.

Figure 4:
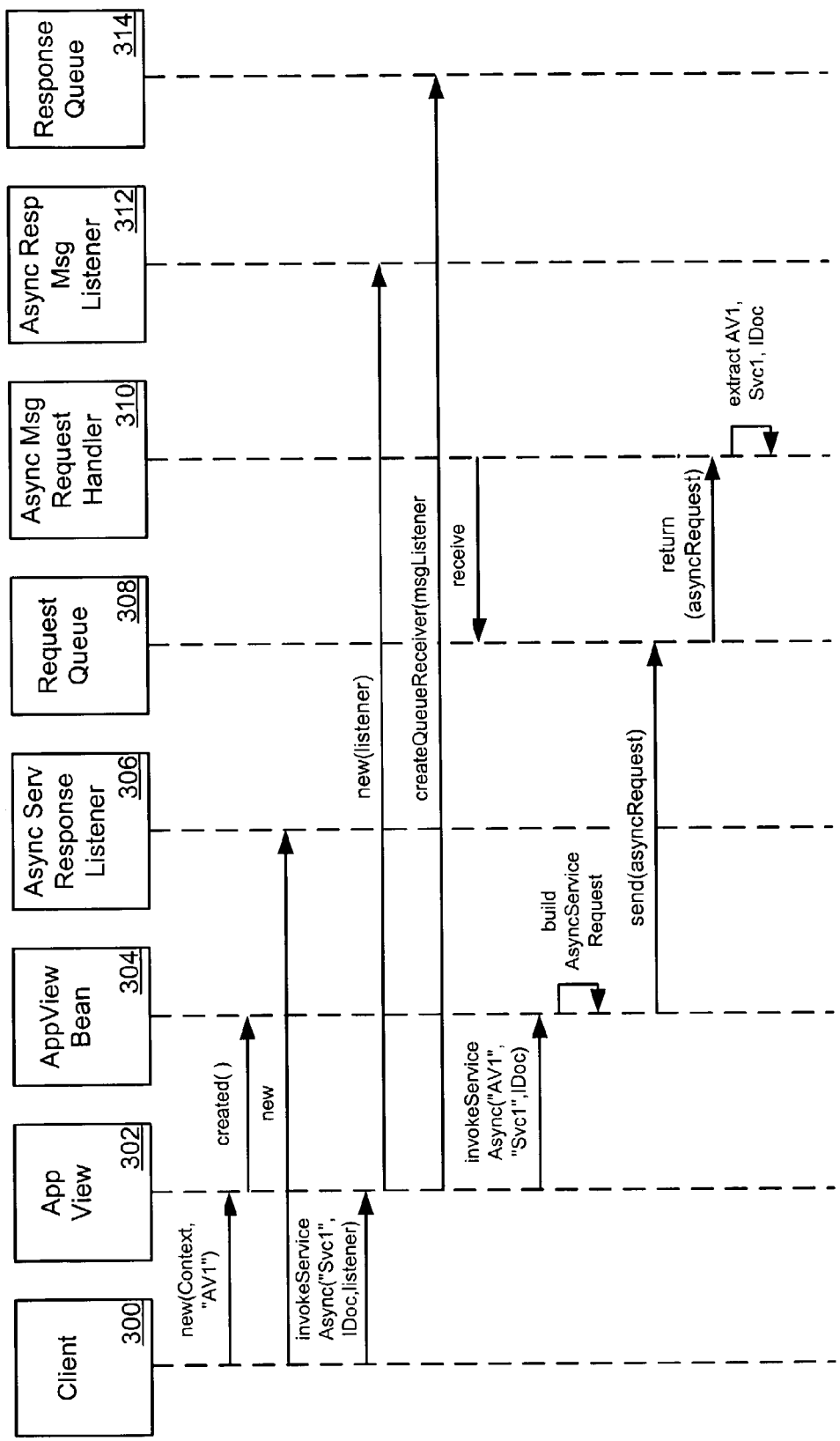
FIGS. 4 and 5 are diagrams showing one method useful for the asynchronous invoking of services that can be used with the system of FIG. 1.
Figure 5:
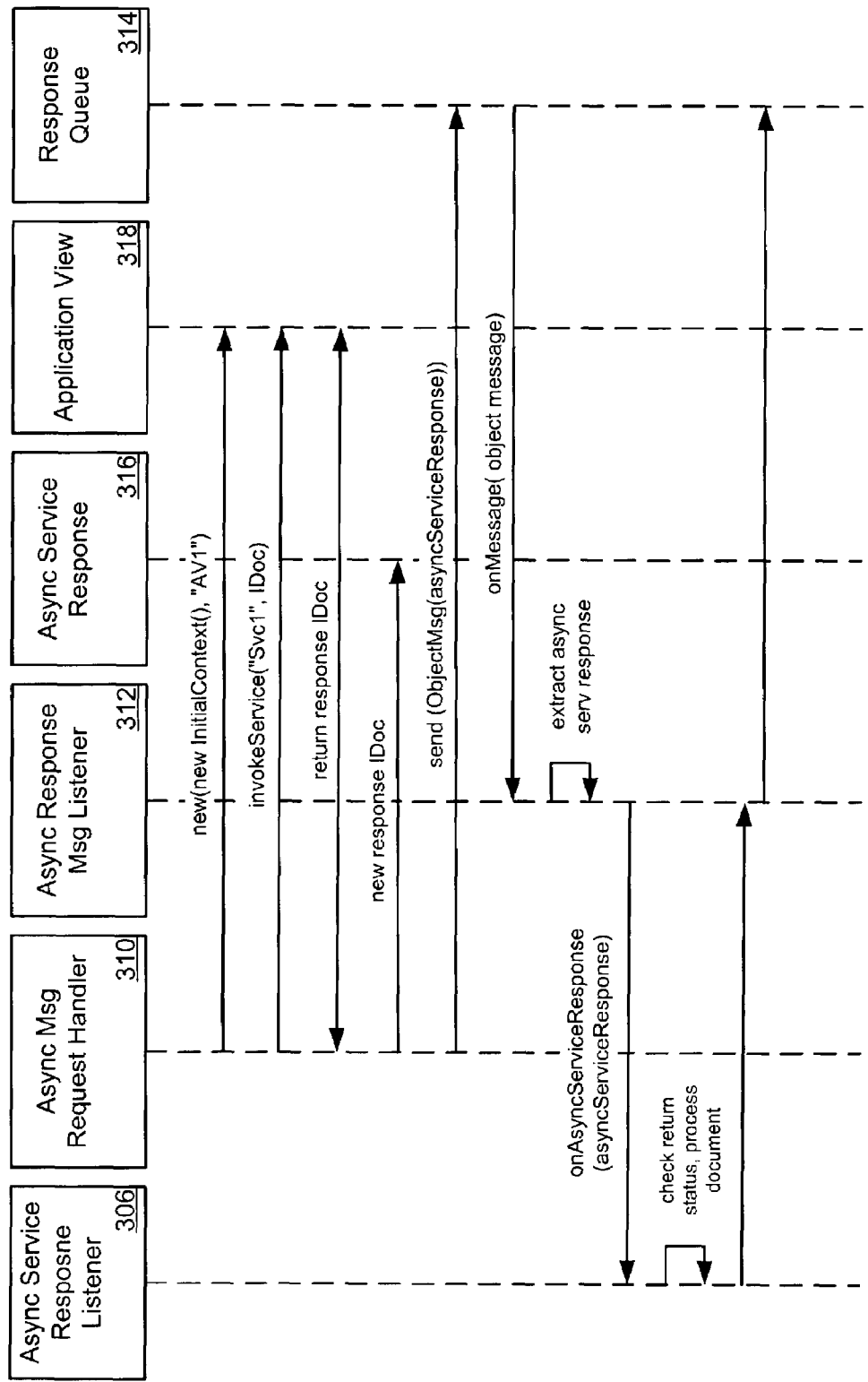

In such a synchronous invoke, a client 200 makes a request and waits until a response is received before the client proceeds with processing. Asynchronous invokes can also be supported. One asynchronous approach is shown in FIGS. 4 and 5. Across the top of the figures are various objects that can be used in an interaction, including a client 300, an application view 302, an application view bean 304, an asynchronous service response listener 306, a request queue 308, an asynchronous message request handler 310, an asynchronous response message listener 312, a response queue 314, an asynchronous service response 316, and an application view 318. In asynchronous mode, a client 300 can make a request for which the client does not need a response right away, but is able to come back later to get the response. This approach can be more complicated than a synchronous approach, as it is necessary to use an underlying queuing mechanism to track requests to, and responses from, an EIS.

Once a client sets up an application view, that application view can have a unique identifier. The unique identifier can be used for filtering back on the server. A user can create a document and invoke a service, such as by calling "invokeServiceAsync." A call-back listener can be passed, which handles the response when it comes back from the server. The application view can post the request onto a JMS queue using a "post (AsyncRequest) via JMSQueueSender" call.

A return response document, or IDoc, can be put into a message queue, such as a JMS queue, by calling a method such as "onMessage(asyncRespMessage)," which can be a virtual call. When the user invoked the service, a call-back listener was registered. Once a message arrives on a JMS queue, the call-back listener can look at the response and determine the appropriate listener to notify that the response has returned. A request such as "OnAsyncServiceResponse" can be serviced on the callback listener. The client can then have a response document in its callback listener, and can do with the document whatever is necessary.

Common Protocol

An application view can take advantage of a common protocol. A common protocol can help make application integration possible, as each application only needs to be integrated with the common protocol rather than with every other application. With a common protocol, all applications can communicate using a standard language, such as XML. One such common protocol can be based on events and services that are represented by XML documents. Adapters can expose an application's functionality and data formats as events and services in an XML format via the application view so that the events and services can be used by all clients of the integration service.

Figure 6A:
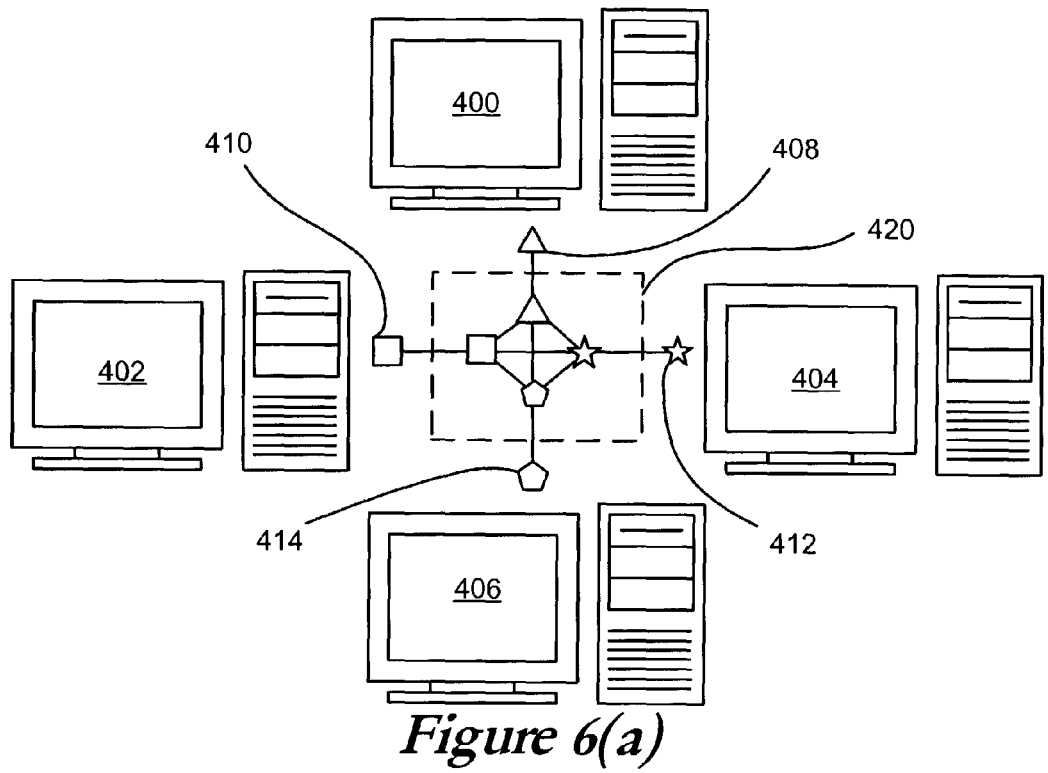
FIGS. 6(a) and 6(b) show computer systems communicating with and without a common protocol in accordance with one embodiment of the present invention.
Figure 6B:
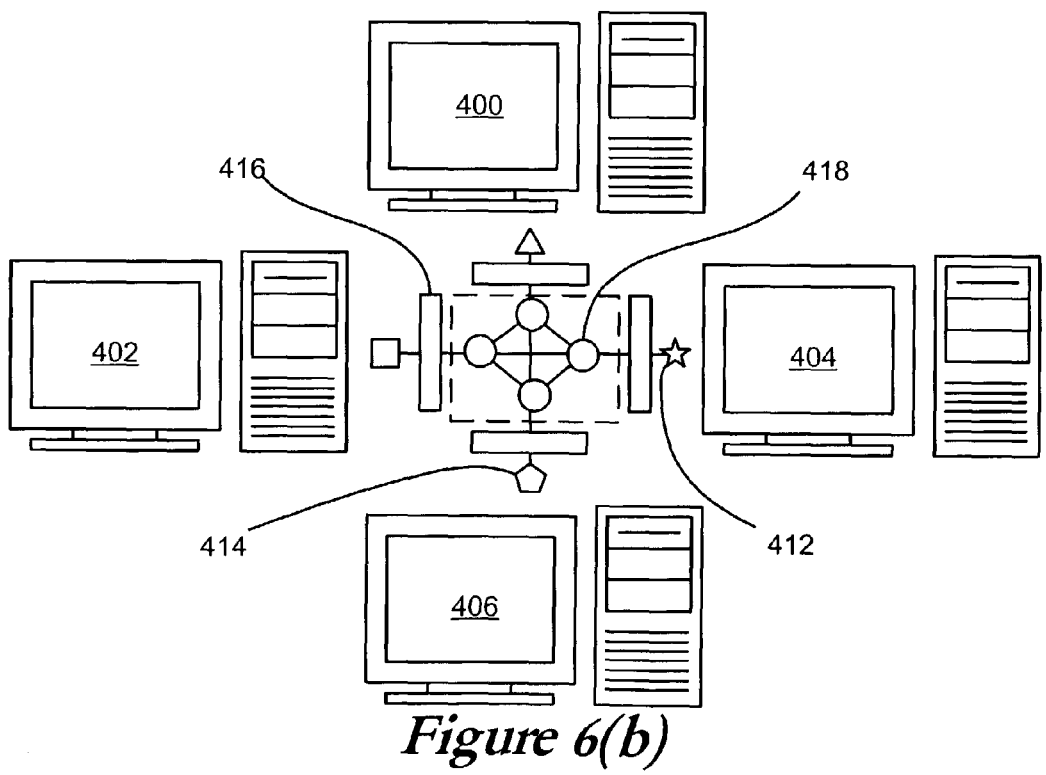
Figure 7:
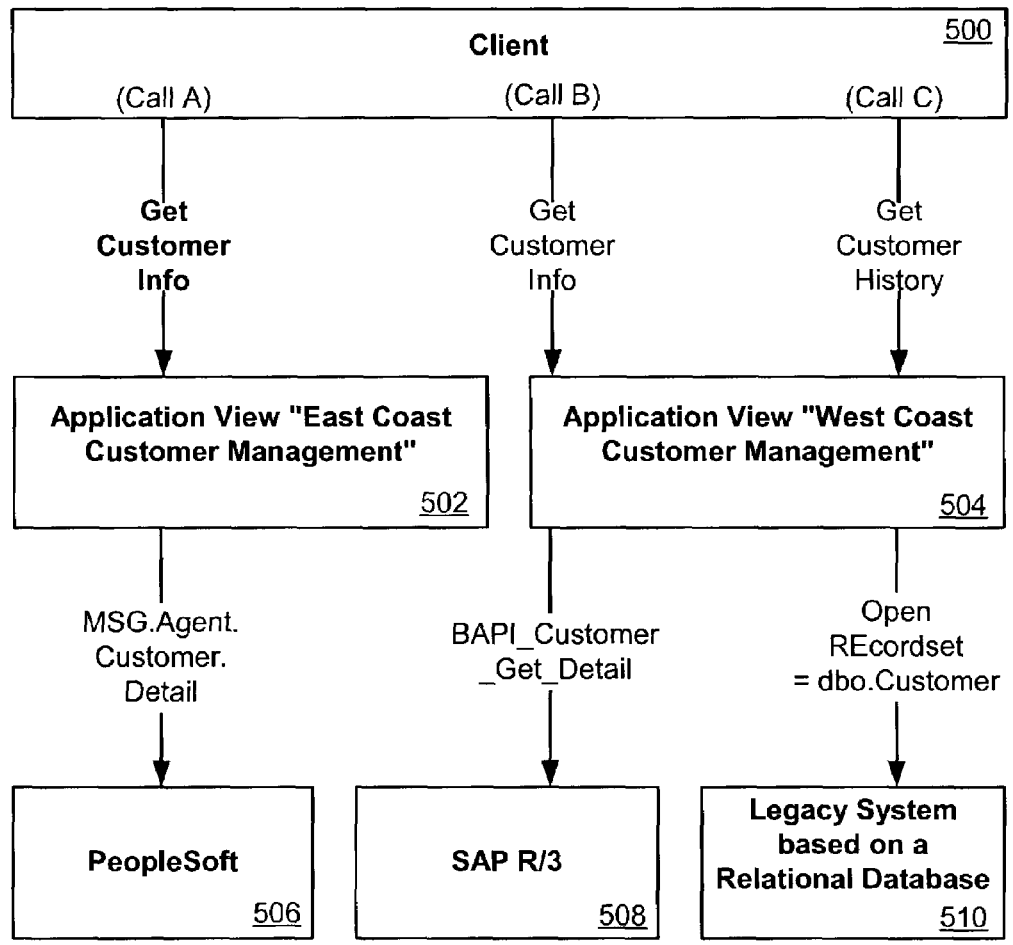
FIG. 7 is a diagram showing a flow of calls that can be used with the system of FIG. 1.

Without a common protocol, there might be a number of different languages that would need to be translated between each other. FIGS. 6(a) and 6(b) illustrate application integration with a common protocol versus application integration without a common protocol. In FIG. 6(a), four computer systems 400, 402, 404, 406 are shown communicating without a common protocol. In this situation, a central hub 420 must handle protocol 408 for computer 400, as well as protocols 410, 412, and 414 for computers 402, 404, and 406, respectively. The hub 420 must also handle all byte formats, character encodings, and type casting for each of the protocols 408, 410, 412, 414.

In FIG. 6(b), an integration framework provides a common protocol 418 for application integration on top of the J2EE Connector architecture. This protocol 418 can be supported via an application view 416, and can consist of events and services encoded as XML documents. Through the use of application views 416, each computer system 400, 402, 404, 406 can communicate with the computer systems using a common protocol, or canonical protocol, without having to understand the other protocols. Further, the central hub does not need to handle multiple protocols 408, 410, 412, 414, but can deal with only the common protocol 418. Each of the application views 416 can enforce a consistent data format and consistent behavior in the integration framework.

Requests to an application view can be made in XML, even though a request made to a target application can use SQL or direct API calls. For example, a client 500 can make calls to three separate applications 506, 508, 510 through two separate application view components 502, 504. A request to one of the application views 502, 504 does not need to address any login information. In call A and call B, both calls are requesting the same information, as call A to the "East Coast" application view 502 is attempting to get customer information, as is call B to the "West Coast" application view 504. The actual data, however, is retrieved from PeopleSoft 506 and SAP 508, respectively. The client 500 initiating the call is not aware of which application is actually processing each request. In calls B and C, both calls are associated with the same application view 504, but each request is handled differently as call B to get customer information gets the information from SAP 508, and call C to get customer history gets the information from a legacy system 510. This allows a logical grouping of information to be handled by a single application view 504. A client 500 or user can see a subset of the functionality available from the target application, and the functionality can be grouped in a form that is more useful.

An application view can be the middleman that translates XML messages into the necessary interfaces required by an EIS, and vice-versa. Additionally, an application view can provide an introspection feature so that a client interested in using the application view can determine which capabilities are available, as well as and the type of XML documents each capability will accept and return.

In an application view, there can be consistent interaction. Outgoing messages can be generated by events and incoming messages can be processed by services. An application view can be dynamically implemented and configured by metadata. There may be no code generation needed. This approach allows for a fluid adaptation to business events and changes. There may be no need for compilers and no need to worry about compatibility, such as with new versions of Java.

Adapter Development Kit (ADK)

An adapter development kit (ADK) can be used to facilitate the construction of adapters that will run, for example, in any J2EE-compliant environment. These adapters can have additional, value-added functionality when hosted within an integration framework component. An ADK can provide tools to allow adapter developers to create bi-directional adapters that support the business-level concepts of events and services. An adapter developed using the ADK can provide access to an application's metadata, which can be used to define events and services via the application view. The ADK can provide run-time support for events and services. The ADK can also provide support for constructing thin, JSP-based user interfaces for use in defining application views based on the adapter.

An ADK can provide a collection of frameworks to support the development, packaging, and distribution of adapters, such as a design-time framework, a run-time framework, a logging/auditing framework, and a packaging framework. A design-time framework can provide a tool set to support the development of a user interface for an adapter. The user interface can be used for defining and deploying application views. This can be a powerful feature, as it can make the adapter capabilities easier to use, giving the adapter a wider audience.

An ADK run-time framework can provide a complete, extensible event generator to support the development of event adapters. To support the development of service adapters, the runtime framework can provide a complete, but minimally functional J2EE-compliant adapter. Adapter developers can save time coding and debugging by starting with and extending this base framework.

An ADK packaging framework can also be utilized that provides a tool set for packaging an adapter for delivery to a customer. This framework can make the creation of various archive and environment files easy for adapter developers.

J2EE Connector Architecture

The lack of widely adopted standards within the application integration market is being addressed by the introduction of standards such as the J2EE Connector architecture and the Java Messaging Service (JMS). JMS provides a standard programming interface to message transport mechanisms. The J2EE Connector architecture provides a standard for application adapters. A J2EE Connector architecture adapter can run within any integration server that supports the J2EE Connector architecture standard.

The adoption of standards such as the J2EE Connector architecture allows packaged application vendors to construct application adapters that will work within any compliant application server. However, the architecture is a new standard that only addresses low-level integration issues. For example, the connector architecture is unidirectional, allowing for synchronous communication from an integration server to an external application. The connector architecture does not, however, specify how an external application can asynchronously send data to an integration server. It also does not provide any common or required interface for application adapters, nor specify how data passed between adapters and applications are encoded.

Basic services, such as events, receiving XML, returning XML, and self-describing available services/events, are not addressed in the J2EE Connector architecture. This is one advantage to using an application view in accordance with one embodiment of the present invention.

The J2EE connector architecture also fails to address application integration at the business level. An application framework in accordance with the present invention adds value to the connector architecture by providing support for business process-level integration and bi-directional data flow between the framework integration server and external applications. A business-level view can be implemented on top of the connector architecture that consists of events and services. An event can be a message delivered asynchronously via JMS from an application, such as by an application adapter, to the framework server. A service can be a function provided by an application that any business process can invoke via the application's adapter.

Event Router

An application programming interface (API) can be used to interact with XML documents, such as to set basic data on an XML document. If a new customer is in an EIS system, there can be information related to that customer such as the customer's name and address. An event generator can do a "post" event, which posts the event to an event router. The event router can transfer the event from an event generator to an application integration server so the application integration server can notify listeners registered for that event. The event router can know how to communicate with the application integration server.

An event router and server can sit on a different server than the main server or application server. This may be a common scenario, as something tightly coupled to an SAP system may be kept close to the SAP system instead of on the main server.

An event router can publish an event message over to the application integration server with a "publish" call of "event message." This can then be published to the application view topic. Once the topic receives the event, it can notify the registered event listener of the client. This can all be based, at least in part, on JMS/XML standards.

Adapters

As discussed above, adapters can be developed as service or event adapters. A service adapter invokes a specific function in the enterprise system to which it is connected. An event adapter propagates information from the enterprise system to the integration environment. For each application view, businesses can add any number of services and events to an application view definition to support specific types of transactions between an application server and the target enterprise system. Because an adapter can use XML to translate an application's data format, business analysts do not need to understand the format. If a business analyst wants to use an adapter, it is only necessary to know how to define and use application views. Best of all, because all adapters can use a similar Web-based interface for defining application views, it can be easy to learn to use current and future adapters. XML can make application integration smooth both for developers and business analysts.

The J2EE specification does not currently provide guidelines for an EIS to initiate communication with the application server or client. Application integration can provide this capability through the user of event adapters. Another important feature of an application view is the ability to support bi-directional communication. The J2EE specification does not currently provide guidelines for an EIS to initiate communication with the application server or client. This capability can be provided by an event adapter. When added to an application view, each event responds to a particular enterprise application state. When a particular event is triggered, the application view can extract data about the event from the enterprise system and propagate the data in an XML document to the integration environment.

Similarly, when added to an application view, each service can represent a particular function in an enterprise system. When an application view receives an XML document that maps to a particular server, it invokes the corresponding function in the enterprise system using the service adapter. The enterprise system can in some embodiments send a response to the service.

Asynchronous Approach

For asynchronous services, such as may require storage of the request ID, a predefined string variable can be selected from the application view Console. If no suitable string variable exists, a "variable properties" dialog box can be opened where a new string variable can be created. When a task node is set up to call an asynchronous application view service, the result can be returned to BPM. The workflow can identify this response using the selected request ID variable. To set an event node to receive the response, the same request ID variable should be used for the event node.

A user may wish to set up an event mode to wait for a response from an asynchronous application view service. In a workflow, whenever an action calls an application view service asynchronously, the application view service will return a response. Normally, if the user wants to know about the response, the user may want to set up a corresponding asynchronous event node to wait for the response. To configure an asynchronous event node to wait for a response from an asynchronous application view service, an event node can be created with the event node being set to wait for an event, such as an event of type "Async Response."

There are at least two primary methods that can be used to set up the event node to receive the asynchronous service response in this embodiment. In a first method, a user can select a "response document" option. When using this method, a user can receive an asynchronous service response by selecting the request ID variable and a response document variable. The request ID variable is a string and the response document variable is of type XML. A second method uses an "asynchronous variable" option. When using this method, the asynchronous service response can be received by selecting the request ID variable and an asynchronous service response variable. The request ID variable is a string and the asynchronous service response variable can be of a type such as "AsyncServiceResponse." A preferred method may be the response document method, as it can provide a universal means of receiving both asynchronous and synchronous responses. When using the response document method, an XML document can be received regardless of whether the response is asynchronous or synchronous, and it will not be necessary to query the value of the asynchronous service response variable.

A response document variable can be used to receive asynchronous service responses whenever possible. Whenever an "event properties" dialog box is set to wait for an event of the asynchronous response type, a user can choose to use an asynchronous variable to receive the response. If an asynchronous response event node is edited that was previously set up to use an asynchronous service response variable to receive the response, then two options can be displayed in an event properties dialog box: an asynchronous variable option and a response document option. In this case, a user can select one of the two methods to receive the service response.

If an existing asynchronous response event node is edited that does not use an asynchronous service response variable or a new asynchronous event node is created, an event properties dialog box can display a dialog box that will allow a user to set a response document to receive the service response.

Although this scenario does not handle errors returned in the application view service response, a user may want to handle errors in specific user workflows. To handle asynchronous service response errors in these workflows that may use, for example, an AsyncServiceResponse variable, a user can use features included in an application integration plug-in. An application integration plug-in in accordance with one embodiment of the present invention can include a variable type such as AsyncServiceResponse and functions such as AIHasError( ), AIGetErrorMsg( ), and AIGetResponseDocument( ).

To set up an asynchronous event node to wait for a response from an asynchronous application view service, an event node can be created and set to wait for an event of a type such as "AI Async Response." Steps for setting an event node to use an XML variable to receive an asynchronous service response can include, first, opening a workflow template definition. A user can create an event node if one does not already exist, which will wait for an asynchronous response from a designated application view service. The user can select an already-defined string variable, and BPM will listen for an asynchronous response with an ID matching this variable.

The event node can wait for a response to an action, such as a call to an application view service, that was called asynchronously earlier in the workflow. The "call application view service" action can set the request ID variable. To make the action and this event node work together, they can both use the same request ID variable.

For asynchronous services that require storage of the response, a user can select a predefined XML variable, such as from a response document variable list. When BPM receives the response from the application view service, the response document variable can be used to store the response. If no suitable XML variable exists, the user can create a new variable. A preferred method for receiving an asynchronous service response may be to use a response document variable of type XML. However, if an existing workflow contains an asynchronous event node that was previously set to use an AsyncServiceResponse variable to wait for a response from an asynchronous application view service, a user can modify the event node.

If an event mode uses an AsyncServiceResponse variable to receive an asynchronous service response, one approach to modifying the event mode uses the following steps. A workflow template definition is opened and an asynchronous variable type selected. A user selects an already-defined string variable, and BPM listens for an asynchronous response with an ID matching this variable.

Callback Listener

A client can choose to invoke a service asynchronously if it is a long-running service. For instance, some SAP requests can take about two or three minutes to process. The processing of the request usually happens transparent to the client. If the user is sitting at a web page, it can be undesirable for the page to simply "hang" for two minutes without doing anything. It may be preferable to issue some sort of response, then update the web page once the proper response is received, such as a new message from SAP. This is one reason for using a callback listener for asynchronous responses. In this way, a client does not want to have to wait around for a response, but will instead be notified when the response is received by the callback listener.

A listen and receive event is another valuable part of certain embodiments in accordance with the present invention, as a listen and receive event is not addressed in the J2EE Connector architecture. A trigger can occur in an EIS, and external applications may need to know about the firing of the trigger. In other words, an event occurs that needs to be propagated out to certain applications. All the registered listeners may need to be notified as well.

As before, a client can create an application view and can add an event listener. A handler is created that knows what to do once it receives an event from the application view. The application view in one embodiment subscribes to a JMS topic and registers the listener on that topic. A JMS topic is a JMS feature to which JMS messages can be posted, similar to an inbox.

There can be defined an object, or application integration component, called an "event generator." One job of the event generator is to watch and communicate with an EIS to determine when an event occurs. For a DBMS adapter, this can involve a query on a staging table. A user can make a request, such as "select*from event." Any record in that event table will be a record of a new event in the DBMS. The event generator periodically look to the EIS for new events.

For example, when an order processing system is running low on an item in inventory, an event can result the system triggering a notification that it needs to restock a certain product. This event can happen, for example, in an EIS. Triggers can be used for DBMS. Once an insert occurs on a certain table, a trigger can fire and place information about the new data into the event table, such as by using an "insert into event . . ." statement. Then, once a new event occurs, the event generator can pull that event.

ADK

An adapter development kit (ADK) is a tool set for implementing an event and service protocol of application integration. An ADK is a collection of frameworks that support the development, testing, packaging, and distribution of resource adapters for application integration. Specifically, an ADK can be comprised of the four primary frameworks, including a design-time framework, a run-time framework, a logging framework, and a packaging framework.

An ADK can address three requirements for adapter development, including a requirement for structure. Regarding structure, a prominent theme in any integrated development and debugging environment, such as IDDE, is development project organization. A well structured development environment is desirable so that a user can immediately begin coding the adapter. A user will usually prefer not to spend time designing and organizing a build process. An ADK can provide an organized development environment, build process, intuitive class names and class hierarchy, and test methodology. Since an ADK encompasses so many advanced technologies, an incremental development process can be the key to success. An ADK test process can allow a developer to make a simple change and test it immediately.

Another requirement for some embodiments includes a minimal exposure to users of the details of peripheral implementation. Peripheral implementation details are sections of code that are needed to support a robust software program, but are not directly related to the kernel of the program. Moreover, peripheral implementation details are sections of code that are needed to support the framework the software program runs in. For example, the J2EE Connector Architecture specification requires that the JAVAX.RESOURCE.CCI.INTERACTIONSPEC implementation class provide getter and setter methods that follow the JavaBeans design pattern. To support the JavaBeans design pattern, a user may need to support PROPERTYCHANGELISTENERS and VETOABLECHANGELISTENERS in an implementation class. A user will not want to have to study the JavaBeans specification to learn how to do this, but would prefer to focus on implementing the enterprise information system (EIS)-specific details of the adapter. The ADK provides base a base implementation for a majority of the peripheral implementation details of an adapter.

It can also be desirable to have a clear road map to success. A key concept in adapter development is the exit criteria. The exit criteria answers the question: "How do I know I am done with an implementation?" In other words, a clear road map details that which needs to be implemented ion order to complete an adapter. An ADK can provide a clear methodology for developing an adapter. The ADK methodology organizes a user's thoughts around a few key concepts: events, services, design time, and run time.

An ADK can provide run-time support for events and services. An ADK can also include an API to integrate an adapter's user interface into the WebLogic Integration Application View Management Console. Another added value that can be provided by an ADK is that adapters can become an integral part of a single graphical console application that allows business users to construct integration solutions.

Resource adapters, which shall be referred to herein as "adapters," are software components that connect one application to another when those applications are not originally designed to communicate with each other. For example, an order entry system built by one company requires an adapter to communicate with a customer information system built by another.

By using an ADK, a user can create at least two types of adapters: service adapters, which consume messages, and event adapters, which generate messages. A user can also use the ADK to create J2EE-compliant adapters that are not specific to an application or application integration environment, but still comply with the J2EE Connector Architecture specification.

These adapters may not contain application integration specifics, such that they can be plugged into any application server that supports the J2EE Connector Architecture specification. These adapters can be developed by making minor modifications to the procedures given for developing a service adapter.

An ADK packaging framework can provide a tool set for packaging an adapter for delivery to a customer. Ideally, all adapters are installed, configured, and uninstalled the same on a single application server. Moreover, all service adapters can be J2EE compliant. The packaging framework can make creating a J2EE adapter archive (.rar) file, Web application archive (.war) file, the enterprise archive (.ear) file, and application integration design environment archive easy.

Adapter activity typically falls within one of two conceptual entities: run time and design time. Run time refers to functionality that occurs when adapters execute their processes. Design time refers to the adapter user's implementation of an application view. In essence, design time is the act of creating, deploying, and testing an application view.

Run time and design time can be characterized in an ADK by run-time and design-time frameworks. A run-time framework can be comprised of the tools used when developing adapters, while the design-time framework can refer to the tools used to design Web-based user interfaces.

A run-time framework is a set of tools that can be used to develop event and service adapters. To support event adapter development, the run-time framework can provide a basic, extensible event generator. For service adapter development, the run-time framework can provide a complete J2EE-compliant adapter.

Classes supplied by the run-time framework can provide several following benefits. One benefit of such a class is that it can allow a user to focus on EIS specifics rather than J2EE specifics. The classes can also minimize the effort needed to use the ADK logging framework, can simplify the complexity of J2EE Connector Architecture, and can minimize redundant code across adapters.

In addition, a run-time framework can provide abstract base classes to help implement an event generator to leverage the event support provided by an ADK environment. A key component of a run-time framework is a run-time engine, which can host the adapter component responsible for handling service invocations, and can manages physical connections to the EIS, login authentication, and transaction management, all in compliance with the J2EE Connector Architecture standard.

A design-time interface for each adapter in accordance with one embodiment of the present invention is a J2EE Web application that is bundled as a .war file. A Web application is a bundle of .jsp, .html, image files, and so on. The Web application descriptor is web.xml. The descriptor instructs the J2EE Web container how to deploy and initialize the Web application. Every Web application has a context. The context is specified during deployment and identifies resources associated with the Web application under the Web container's doc root.

An ADK can be used to create event adapters and service adapters. Within the ADK architecture, services and events can be defined as self-describing objects that use an XML schema to define their input and output.

Each adapter created can have an adapter logical name, a unique identifier that represents an individual adapter and serves as the organizing principle for all adapters. As such, the adapter logical name can be used to identify an individual adapter and can be used to name a message bundle, a logging configuration, and log categories. An adapter logical name can be, for example, a combination of the vendor name, the type of EIS connected to the adapter, and the version number of the EIS. By convention, this information can be expressed as VENDOR_EIS-TYPE_EIS version.

An adapter logical name can be used with adapters in a number of ways. One way is to use it as a convention, although this is not required. Another way is to use it during adapter deployment as part of the .war, .rar, .jar, and ear filenames. It can also be used as an organizing principle, or as a return value to an abstract method such as getAdapterLogicalName( ).

The Name attribute of a <ConnectorComponent> element can be an adapter logical name. This can be a key that is used by application integration to associate application views to a deployed resource adapter, as shown for the sample adapter:
    <ConnectorComponent
    Name="BEA_WLS_SAMPLE_ADK"
    Targets="myserver"
    URI="BEA_WLS_SAMPLE_ADK.rar"/>

The adapter logical name can be used as the name of the rar file as a convention, but is not required in the URI attribute.

Lastly, the adapter logical name can be used as a return value to the abstract method getAdapterLogicalName( ) on a com.adapter.web.AbstractDesignTimeRequestHandler. This return value can be used during the deployment of application views as the value for the RootLogContext for a connection factory.

When an application view is deployed, it can have an associated J2EE Connector Architecture CCI connection factory deployment. For example, if a user deploys the abc.xyz application view, application integration can deploy a new ConnectionFactory and bind it to a JNDI location connectionFactoryInstance. For efficiency sake, the new connection factory deployment can use the <ra-link-ref> setting in the weblogic-ra.xml deployment descriptor.

The <ra-link-ret> element can allow for the logical association of multiple deployed connection factories with a single deployed adapter. The specification of the optional <ra-link-ref> element with a value identifying a separately deployed connection factory can result in this newly deployed connection factory sharing the adapter which had been deployed with the referenced connection factory. In addition, any values defined in the referred connection factory's deployment can be inherited by this newly deployed connection factory unless specified. The adapter logical name can be used as the value for the <ra-link-ref> element.

An ADK can use Enterprise Archive files, or .ear files, for deploying adapters. A single ear file can contain the .war and .rar files, as well as any Event Router Web application files necessary to deploy an adapter.

ADK classes, interfaces, methods, and constructors can be defined in Javadocs included in a development kit. An ADK can employ a build process based upon Ant, a 100% pure Java-based build tool. For the ADK, Ant can facilitate creating a Java archive (.jar) file for the adapter, creating .war file for an adapter's Web application, creating a .rar file for a J2EE-compliant adapter, and encapsulating the above listed components into a ear file for deployment.

Traditionally, build tools are inherently shell-based. They evaluate a set of dependencies and then execute commands, not unlike those that would be issued on a shell. While it is simple to extend these tools by using or writing any program for a user-specific operating system, the user is also limited to that OS, or at least that OS type, such as for example.

Ant can be preferable to shell-based make tools for several reasons. First, instead of a model where it is extended with shell-based commands, it is extended using Java classes. Second, instead of writing shell commands, the configuration files can be XML-based, calling out a target tree where various tasks get executed. Each task can be run by an object that implements a particular task interface. While this can remove some of the expressive power inherent in being able to construct a shell command, it can give an application the ability to be cross-platform. Also, if a user wants to execute a shell command, Ant has an execute rule that can allow different commands to be executed based on the OS upon which it is executing.

Logging Toolkit

A logging toolkit is a framework that can wrap the necessary classes to provide added functionality for J2EE-compliant adapters. It can be provided in a jar file. This jar file can depend, for example, on DOM, XERCES, and Log4j.

A logging configuration file is an .xml file that can be identified by the adapter logical name, such as for example DBMS_ADK.xml. It can contain base information for logging concepts and can be modified for a specific adapter.

In one embodiment, logging has four main components: message categories, message priority, message appenders, and message layout. These components can work together to enable a user to log messages according to message type and priority, and to control at run time how these messages are formatted and where they are reported.

Categories can be hierarchically defined. That is, any category can inherit properties from parent categories. The hierarchy can be defined for one embodiment as follows. A category is an ancestor of another category if its name followed by a dot is a prefix of the descendant category name. A category is a parent of a child category if there are no ancestors between itself and the descendant category. The root category can reside at the top of the category hierarchy. It may always exist and cannot be retrieved by name.

Every message can have a priority that indicates its importance. Message priority can be determined by the method on an interface used to log the message. In other words, calling a debug method on a logging instance can generate a debug message. One embodiment of the logging toolkit can support five possible priorities for a given message, including AUDIT, ERROR, WARN, INFO, and DEBUG. AUDIT can indicate an extremely important log message that relates to the business processing performed by an adapter. Messages with this priority can always be written to the log output. ERROR can indicate an error in the adapter. Error messages can be internationalized/localized for the user. WARN can indicate a situation that is not an error, but could cause problems in the adapter. This can include a warning message that is internationalized/localized for the user. INFO can indicate an informational message that is internationalized/localized for the user. DEBUG can indicate a debug message, which can be used to determine how the internals of a component are working and are typically not internationalized.

A priority can be assigned to a category. If a given category is not assigned a priority, it can inherit one from its closest ancestor with an assigned priority. In other words, the inherited priority for a given category can be equal to the first non-null priority in the category hierarchy, starting at the given category and proceeding upwards in the hierarchy towards the root category.

A log message can be output to the log destination if its priority is higher than or equal to the priority of its category. Otherwise, the message may not be written to the log destinations. A category without an assigned priority can inherit one from the hierarchy. To ensure that all categories can eventually inherit a priority, the root category can always have an assigned priority. A log statement of priority p in a category with inherited priority q can be enabled if p is greater than, or equal to, q. This rule assumes that priorities are ordered as follows: DEBUG<INFO<WARN<ERROR<AUDIT.

A logging framework can allow an adapter to log to multiple destinations by using an interface called an appender. Log4j can be used, which provides appenders for the console, files, remote socket servers, NT Event Loggers, and Remote Unix Syslog daemons. In addition, an appender can be used that allows a user to specify that a log message would be output to a log for the user's application server.

A category can refer to multiple appenders. Each enabled logging request for a given category can be forwarded to all the appenders in that category, as well as the appenders higher in the hierarchy. In other words, appenders can be inherited additively from the category hierarchy. For example, if a console appender is added to the root category, then all enabled logging requests will at least print on the console. If in addition a file appender is added to category "C," then enabled logging requests for C and C's children will print to a file and on the console. It is possible to override this default behavior so that appender accumulation is no longer additive by setting the additivity flag to false.

By using Log4j, a user can also customize the format of a log message. This can be accomplished by associating a layout with an appender. The layout is responsible for formatting a log message while an appender directs the formatted message to its destination. The log toolkit typically uses the PatternLayout to format its log messages. The PatternLayout, part of a standard Log4j distribution, allows a user to specify the output format according to conversion patterns.

Setting up a logging framework for an adapter in accordance with one embodiment of the present invention is a four-step process. In the first step, a user should identify all of the basic components used in the adapter. For example, if an adapter has an EventGenerator, a user might want to have an EventGenerator component; if it supports a design-time GUI, a user may need a design-time component.

In addition to understanding the basic concepts of a logging framework, a user may also need to understand three main classes provided in a log toolkit, referred to herein as ILogger, LogContext, and LogManager. ILogger is a main interface to a logging framework. It can provide numerous convenience methods for logging messages. LogContext is a class that can encapsulate information needed to identify an ILogger instance in the logging framework. A LogContext can encapsulate a log category name and a locale, such as en_US. This class can be a primary key for uniquely identifying an ILogger instance in the log manager. A LogManager class can provide a method to allow a user to configure the logging framework and provide access to ILogger instances.

An ADK can hide most of the log configuration and setup from a user. An AbstractManagedConnectionFactory class can configure a log toolkit for service adapters and an AbstractEventGenerator can configure a log toolkit for event adapters. In addition, all of the Client Connector Interface (CCI) and Service Provider Interface (SPI) base classes that can be provided in an ADK can provide access to an ILogger and its associated LogContext. For other layers in an adapter to access the correct ILogger object, there are at least two approaches that can be taken. Herein, "Other layers" refers to layers in an adapter that support the CCI/SPI layer, such as a socket layer for establishing communication to the EIS.

In a first approach, the CCI/SPI layers can pass the LogContext object into the lower layers. This works but can also add overhead. In a second approach, a CCI layer can establish a LogContext for the current running thread at the earliest possible place in the code. An ADK's ConnectionFactoryImpl class can set the LogContext for the current running thread in the getConnection( ) methods. The getconnection( ) methods can be the first point of contact a client program has with an adapter. Consequently, lower layers in an adapter can safely access the LogContext for the current running thread.

Additionally, a convenience method can be provided on the LogManager, such as may be given by:

public static ILogger getLogger( ) throws IllegalStateException

This method can provide an ILogger for the current running thread. There is one caveat to using this approach: lower layers in some embodiments should not store the LogContext or ILogger as members. Rather, they should dynamically retrieve them from the LogManager. An IllegalStateException can be thrown if this method is called before a LogContext is set for the current running thread.

Internationalization and localization can be central concepts to an ADK logging framework. All logging convenience methods on an ILogger interface, except the debug methods, allow for internationalization, such as I18N. The implementation can follow Java Internationalization standards, such as by using ResourceBundle objects to store locale-specific messages or templates.

Most real-world systems have to deal with multiple clients simultaneously. In a typical multi-threaded implementation of such a system, different threads can handle different clients. Logging can be especially well suited to trace and debug complex distributed applications. One approach to differentiate the logging output of one client from another is to instantiate a new separate category for each client. This promotes the proliferation of categories and increases the management overhead of logging.

A lighter technique is to uniquely stamp each log request initiated from the same client interaction. To uniquely stamp each request, a user can push contextual information into a Nested Diagnostic Context (NDC). A logging toolkit can provide a separate interface for accessing NDC methods. The interface can be retrieved from the ILogger such as by using a method getNDCInterface( ).

NDC printing can be turned on in the XML configuration file, such as with the symbol % x. Every time a log request is made, the appropriate logging framework component can include the entire NDC stack for the current thread in the log output. The user may not need to intervene in this process. In fact, the user can be responsible only for placing the correct information in the NDC by using the push and pop methods at a few well-defined points in the code.

Service Adapters

Service adapters can receive an XML request document from a client and invoke the associated function in the underlying EIS. They can be consumers of messages and may or may not provide a response. Service adapters can perform at least four primary functions. Service adapters can receive service requests from an external client. Service adapters can transform an XML request document into an EIS specific format. The request document can conform to a request XML schema for the service. The request XML schema can be based on metadata in the EIS.

They invoke the underlying function in the EIS and wait for its response. They transform the response from the EIS specific data format to an XML document that conforms to the response XML schema for the service. The response XML schema is based on metadata in the EIS.

Figure 8:
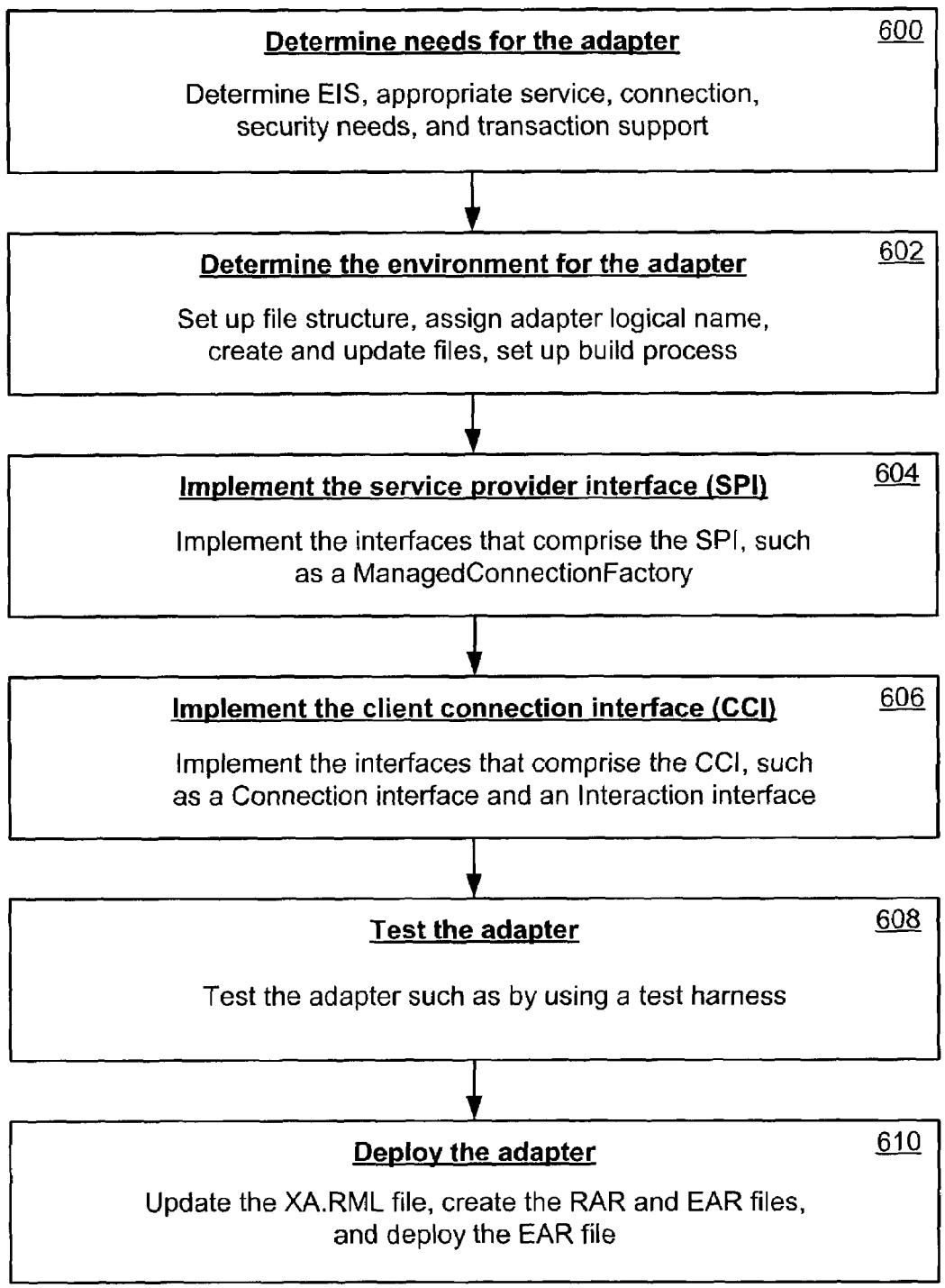
FIG. 8 is a flowchart showing a method for developing a service adapter that can be used with the system of FIG. 1.

As discussed above, FIGS. 2-5 show processes executed when a service adapter is used in a run-time environment. FIGS. 2 and 3 show an asynchronous service adapter while FIGS. 4 and 5 show a synchronous adapter. FIG. 8 outlines one approach to developing a service adapter in accordance with one embodiment of the present invention. First, a user can determine various needs for the adapter 600. A user can determine the EIS and the appropriate service required for this adapter. This can be based upon the user's knowledge of the EIS, and the user must identify the interface to the back-end functionality. A user can also determine an "expensive" connection object required to invoke a function within the EIS. The expensive connection object is a resource used to communicate with the EIS that can require the allocation of system resources, such as a socket connection or DBMS connection. A valuable asset of the J2EE Connector architecture is that the application server can provide pooling of these objects. Therefore, a user can determine this object for the adapter, as it may need to be pooled by the application server. The user can also determine the environment for the adapter 602, such as by setting up a file structure and assigning an adapter logical name. The user can then implement the SPI 604 and CCI 606 for the adapter. The user can then test 608 and deploy 610 the adapter.

ManagedConnectionFactory

In the ADK sample adapter, the class sample.spi.ManagedConnectionFactoryImpl is provided. This class extends AbstractManagedConnectionFactory. Use this class as an example of how to extend the ADK's base class.

The ManagedConnection object is responsible for encapsulating all expensive resources needed to establish connectivity to the EIS. A ManagedConnection instance represents a physical connection to the underlying EIS. ManagedConnection objects are pooled by the application server in a managed environment.

An ADK can provide an abstract implementation of ManagedConnection. The base class can provide logic for managing connection event listeners and multiple application-level connection handles per ManagedConnection instance. When implementing a ManagedConnection interface, the user may need to determine the transaction demarcation support provided by the underlying EIS.

An ADK can also provide AbstractManagedConnection, an abstract implementation for the javax.resource.spi.ManagedConnection interface that can provide access to an ADK logging framework. The implementation can also manage a collection of connection event listeners, and can provide convenience methods for notifying all connection event listeners of connection-related events. It can also simplify clean-up and destruction of a ManagedConnection instance.

A ManagedConnectionMetaData interface can provide information about an underlying EIS instance associated with a ManagedConnection instance. An application server can use this information to get run-time information about a connected EIS instance. An ADK can also provide AbstractManagedConnectionMetaData, an abstract implementation of the ManagedConnectionMetaData and ConnectionMetaData interfaces that can simplify exception handling, provide access to an AbstractManagedConnection instance, allow a user to focus on implementing EIS-specific logic, and can prevent a user from having a separate metadata class for the CCI and SPI implementations.

A ConnectionEventListener interface can provide an event callback mechanism that enables an application server to receive notifications from a ManagedConnection instance.

An ADK can provide at least two concrete implementations of ConnectionEventListener. One implementation is a ConnectionEventLogger, which logs connection-related events to the adapter's log by using the ADK logging framework. Another implementation is a NonManagedConnectionEventListener which can destroy ManagedConnection instances when the adapter is running in a non-managed environment. This implementation can log connection-related events using the ADK logging framework, and can destroy ManagedConnection instances when a connection related error occurs.

An ADK can provide a concrete implementation of NonManagedConnectionManager. This implementation can provide a basic connection manager for adapters running in a non-managed environment. In a managed environment, this interface can be provided by the application server. NonManagedConnectionManager is a concrete implementation of the ConnectionManager interface. It can serve as the ConnectionManager in the non-managed scenario for an adapter. It may not provide any connection pooling or any other quality of service.

A ConnectionRequestInfo interface can enable an adapter to pass its own request specific data structure across the connection request flow. An adapter extends the empty interface to support its own data structures for a connection request.

An ADK can provide a concrete implementation of an interface called ConnectionRequestInfoMap. This is a concrete implementation of the ConnectionRequestInfo interface and can provides a java.util.Map interface to such connection request information as username and password. An ADK can also provide an abstract implementation of this interface called AbstractLocalTransaction. This implementation can allow a user to focus on implementing the EIS-specific aspects of a LocalTransaction. This implementation can simplify exception handling, allow adapter providers to focus on implementing EIS-specific transaction logic, and prevent a user from having a separate metadata class for the CCI and SPI implementations.

A user may also need to implement the CCI. This client interface can allow a J2EE-compliant application to connect to, and access, back-end systems. The client interface can manage the flow of data between the client application and the back-end system, and may not have any visibility into what either the container or the application server are doing with the adapter. The client interface can specify the format of the request and response records for a given interaction with the EIS.

First, the user must determine whether the adapter must support the J2EE-compliant Common Client Interface (CCI). Although not a requirement in the current J2EE specification, it may be a requirement in a later version. Consequently, the ADK can focus on helping a user implement a CCI interface for the adapter.

To implement the CCI for an adapter, a user can extend at least two interfaces, including Connection, which represents an application-level handle that can be used by a client to access the underlying physical connection, and Interaction, which can enable a component to execute EIS functions. In some embodiments, a user should implement these interfaces in the order specified. In addition to these interfaces, a user can implement any other interfaces needed by the adapter. These interfaces can include ConnectionFactory, ConnectionMetaData, ConnectionSpec, InteractionSpec, LocalTransaction, Record, and ResourceAdapterMetaData.

A Connection can represent an application-level handle that can be used by a client to access the underlying physical connection. The actual physical connection associated with a Connection instance can be represented by a ManagedConnection instance. A client can get a Connection instance by using a getconnection( ) method on a ConnectionFactory instance. A Connection can be associated with zero or more Interaction instances.

An ADK can provide an abstract implementation of an interface called AbstractConnection that provides functionality including access to an ADK logging framework, access to an AbstractManagedConnection instance, and state management and assertion checking. A user may need to extend this class by providing an implementation for:

Public Interaction createInteraction( ) throws ResourceException.

This method can create an interaction associated with this connection. An interaction enables an application to execute EIS functions. This method can return an Interaction instance and throw a ResourceException if the "create" operation fails. An Interaction instance can enable a component to execute EIS functions. An Interaction instance can support several ways of interacting with an EIS instance. One way is through an execute( ) method that takes an input Record, output Record, and InteractionSpec. This method can execute the EIS function represented by the InteractionSpec and can update the output Record.

An executes method that takes an input Record and an InteractionSpec. This method implementation executes the EIS function represented by the InteractionSpec and produces the output Record as a return value.

An Interaction instance is created from a connection and is required to maintain its association with the Connection instance. The close( ) method releases all resources maintained by the adapter for the interaction. The close of an Interaction instance should not close the associated Connection instance.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system having a processor and a computer-readable storage medium for integrating enterprise information systems, comprising:

an application view that provides a layer of abstraction to internal enterprise information system functions by defining a set of business functions, wherein the application view is stored on the computer-readable storage medium;

a resource adapter that invokes the internal enterprise information system functions and exposes said internal enterprise information system functions to the application view, wherein J2EE Connector architecture (JCA) provides a standardized approach for the development of the resource adapter, wherein the resource adapter is stored on the computer-readable storage medium;

an application integration framework built on top of the JCA to provide a standards-based architecture for hosting the resource adapter, wherein the application integration framework implements a common model on top of the JCA that is focused on business-level concepts; and a common communications protocol that defines events and services encoded as XML documents for communicating with the enterprise information system, said events and services further including:

an event initiated by the enterprise information system, said event responding to a particular application state in the enterprise information system, wherein one or more client listeners registered for the event receive data regarding said event when the event is triggered, such that the data is extracted and propagated from the enterprise information system by the application view at the time of the event being triggered in the enterprise information system; and a service that is executed upon receiving a request, wherein service execution causes the application view to invoke at least one of the internal enterprise information system functions.

2. The system according to claim 1, further comprising:
a J2EE-compliant application server to contain the resource adapter and the application view.

3. The system according to claim 2, further comprising:
the enterprise information system that is connected to the J2EE-compliant application server by the resource adapter.

4. The system of claim 2 wherein the enterprise information system utilizes the event to initiate communication with the J2EE-compliant application server.

5. The system according to claim 1, further comprising:
an event generator that communicates the event in the enterprise system to a client application.

6. The system according to claim 1, further comprising:
a transport system to allow the transporting of messages to and from the application view.

7. The system according to claim 1, wherein:
the application integration framework provides high availability, scalability, clustering, and resource pooling.

8. The system according to claim 1, wherein:
the application integration framework provides for universal connectivity by enabling a construction of XML-based application adapters that connect to a legacy and packaged application.

9. The system according to claim 1, further comprising:
an adapter development kit to allow users to quickly develop J2EE connector architecture-compliant and application integration framework-based adapters.

10. The system according to claim 1, further comprising:
a business-process engine to allow users to graphically construct and maintain business processes using the application integration framework.

11. The system according to claim 1, wherein:
the common model includes XML-encoded events and services to manage an integration environment, regardless of an interface required between the resource adapter and a target application.

12. The system according to claim 1, further comprising:
a JCA connector to obtain a connection to an application for the application view in response to an invoke request.

13. The system according to claim 12, wherein:
the invoke request triggers an interaction whereby the JCA connector obtains the connection.

14. The system according to claim 13, wherein:
the interaction invokes functionality in the enterprise system and conceals that functionality behind standard APIs.

15. The system of claim 1, further comprising:
a Common Client Interface (CCI) API to enable low level function invocations to services of the enterprise information system to be made by at least one client.

16. The system of claim 1 wherein the resource adapter further includes one or more of:
an event adapter that generates messages and a service adapter that consumes messages.

* * * * *

UNITED STATES PATENT AND TRADEMARK OFFICE
CERTIFICATE OF CORRECTION

| | | |
|---|---|---|
| PATENT NO. | : 7,546,606 B2 | Page 1 of 1 |
| APPLICATION NO. | : 10/271156 | |
| DATED | : June 9, 2009 | |
| INVENTOR(S) | : Mitch Upton | |

It is certified that error appears in the above-identified patent and that said Letters Patent is hereby corrected as shown below:

On face page, in field (56), in column 2, under "Other Publications", line 3, delete "of" and insert -- on --, therefor.

On page 4, in column 2, under "Other Publications", line 6, delete "Adaption" and insert -- Adaptation --, therefor.

In column 16, line 8, delete "ear" and insert -- .ear --, therefor.

In column 16, line 21, delete "rar" and insert -- .rar --, therefor.

In column 16, line 37, delete "<ra-link-ret>" and insert -- <ra-link-ref> --, therefor.

In column 16, line 49, delete "ear" and insert -- .ear --, therefor.

In column 16, line 59, delete "ear" and insert -- .ear --, therefor.

In column 17, line 15, delete "jar" and insert -- .jar --, therefor.

In column 17, line 15, delete "jar" and insert -- .jar --, therefor.

In column 22, line 2, delete "getconnection( )" and insert -- getConnection( ) --, therefor.

In column 22, line 23, delete "executes" and insert -- execute( ) --, therefor.

Signed and Sealed this

First Day of June, 2010

David J. Kappos
*Director of the United States Patent and Trademark Office*